(12) United States Patent
Pettersson et al.

(10) Patent No.: US 11,055,034 B2
(45) Date of Patent: Jul. 6, 2021

(54) LABEL COST SAVING FUNCTION

(71) Applicant: SATO HOLDINGS KABUSHIKI KAISHA, Tokyo (JP)

(72) Inventors: Bengt Pettersson, Gothenburg (SE); Mats Hedberg, Tokyo (JP); Taisaku Ota, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 787 days.

(21) Appl. No.: 15/509,263

(22) PCT Filed: Oct. 16, 2014

(86) PCT No.: PCT/EP2014/072270
§ 371 (c)(1),
(2) Date: Mar. 7, 2017

(87) PCT Pub. No.: WO2016/058646
PCT Pub. Date: Apr. 21, 2016

(65) Prior Publication Data
US 2020/0142648 A1 May 7, 2020

(51) Int. Cl.
*G06F 3/12* (2006.01)
*G06F 40/103* (2020.01)
(52) U.S. Cl.
CPC .......... *G06F 3/1208* (2013.01); *G06F 3/1219* (2013.01); *G06F 3/1243* (2013.01); *G06F 40/103* (2020.01)
(58) Field of Classification Search
CPC .............................. G06F 3/1208; G06F 40/103
See application file for complete search history.

(56) References Cited

U.S. PATENT DOCUMENTS 5,895,475 A * 4/1999 Eisenberg ............. G06F 40/103
715/209
8,804,139 B1 8/2014 Arora et al.
(Continued)

FOREIGN PATENT DOCUMENTS

JP 2010017933 A 1/2010
WO 2012011152 A1 1/2012
WO 2012/057804 A1 5/2012

OTHER PUBLICATIONS

International Search Report dated Jun. 22, 2015, issued in counterpart International Application No. PCT/EP2014/072270 (2 pages).
(Continued)

*Primary Examiner* — Ibrahim Siddo
(74) *Attorney, Agent, or Firm* — Westerman, Hattori, Daniels & Adrian, LLP

(57) ABSTRACT

The present invention provides a computer-implemented method and system for modifying given layout data on the basis of predetermined parameters for reducing unused white areas in accordance with a given printing layout. The invention is particularly applicable in the framework of label and tag printers employing continuous media. On the one hand, the reduction of unused white areas can lead to an overall reduction in the paper size, thus rendering the labels more environmentally friendly. On the other hand, the layout can also be improved, leading to a better usage of the available space for printing data thereon.

19 Claims, 21 Drawing Sheets

(56) References Cited

U.S. PATENT DOCUMENTS

2007/0113174 A1* 5/2007 Iwasaki .................. G06T 11/60
                                                            715/246
2012/0229860 A1   9/2012 Morita
2013/0128314 A1* 5/2013 Chopra ................. G06F 3/1241
                                                            358/1.18

OTHER PUBLICATIONS

International Preliminary Report dated Apr. 18, 2017, issued in International Patent Application No. PCT/EP2014/072270.
European Search Report dated Nov. 27, 2019, issued in counterpart application No. 14 790 548.3.
Office Action dated Jul. 7, 2020, issued in counterpart EP Application No. 14 790 548.3 (8 pages).

* cited by examiner

LABEL COST SAVING FUNCTION

FIELD OF THE INVENTION

The present invention generally relates to printers, in particular to label and tag printers. More specifically, the present invention relates to a computer-implemented method for modifying print layouts, which can specifically be applied to reduce the costs of labels to be printed.

BACKGROUND ART

Printers, in particular label and tag printers, are devices capable of printing contents, in particular text and graphics, on a print medium such as a strip of paper. The print data are derived from contents data including, in particular, the text and/or graphics to be printed, and from layout data defining the layout of the content to be printed, such as print position, font type and point size, or the definition of particular fields in which text and/or graphics are to be printed. The definition of fields includes, in particular, the size (i.e. width and height) of the field, as well as the position thereof on the print medium and orientation information.

For instance, if text is to be printed into a particular field, the point size must be set so that the longest line or row of text does not extend beyond the width of the field. In other words, the point size depends on the amount of text in each field. On the other hand, in view of the above, a font having a small point size may be required, which decreases the readability of the text.

The layout data for a particular medium to be printed on, for instance on a label, are generally predetermined on a computing device such as a workstation. Conventionally, there are text based command interfaces for performing a layout definition, such as ZPL (Z-level Programming Language). DPL (Decision Programming Language) and SPL (System Programming Language). More recently, software applications have been developed to provide graphical user interfaces and tools for custom label design and layout. An example of a label design and layout software application is given in international patent application publication WO 2012/011152. The application allows for an enhanced flexibility in customizing the format of print areas, such as text boxes or text fields for printing texts therein. A user can define, via a graphic user interface provided by a computer, a plurality of parameters defining the print area. The parameters also include parameters that control the handling of specific situations, wherein a predetermined text to be printed does not fit into a user-defined print area. For instance, such parameters may define whether "wrapping" of lines is allowed, whether the size of the print area will automatically be extended beyond the user-defined size in a particular direction in such a way that the text completely fits into the print area, or whether part of the text will simply be omitted. Thereby, at least partially automatic adjustments of layout parameters such as font type, point size and others can be performed.

The layout data including the parameters defining the layout together with the contents data defining the actual text to be printed or graphical elements is then merged into print data that is sent to a printer for being printed out. For this purpose, there is a printer driver installed at the computer controlling operation of the printer.

The transfer of the print data can be achieved via a permanent connection between a computer and the printer (online printer). The required physical connection between the computer and the printer for providing data to the printer may be either hard-wired or wireless, such as by means of WLAN (wireless local area network).

Alternatively, printers, in particular label and tag printers, operate as stand-alone printers, without requiring a computer to be physically attached for operation. The print data are provided with stand-alone printers in advance, and pre-stored in a memory of the printer. Furthermore, stand-alone printers usually include an input device such as a keyboard and a display, to allow for some communication with the user. In particular, a user may to a certain extent amend the contents to be printed, by entering particular data via the input device. Data entered via the input device are inserted into the prepared print data at the positions of predefined placeholders.

A general problem that occurs in connection with employing a predefined layout or printing data on a medium resides in the fact that the amount of text to be printed may be considerably different between particular print items of the same type. For instance, a product label in a shop may include a list of ingredients. However, the number of ingredients and therefore the length of the list may be rather different for different products. The predefined layout shall take into account the maximum amount of text (the maximum length of the list to be expected), in order to avoid that, for some labels, the full contents cannot be printed. In situations where the text amount is much less than the maximum amount, this leads to many unused (blank or white) areas. In particular, since the layout also defines the size of a label, a lot of paper will remain unused for printing and is thus wasted.

On the one hand, in view of the large number of labels printed every day, this leads to a considerable increase in costs, and on the other hand negatively affects ecology. On the other hand, since further layout parameters such as the point size shall also take into account the possible maximum amount of text to be printed, in spite of the large white areas, the point size of the font may nevertheless be rather small, so that readability is reduced.

A printer that partly addresses the above problem has been described in Japanese patent application JP2010-017933 A. The printer receives print data from a host, and is capable of determining when the print data includes blank spaces having a size extending beyond a predetermined size. The printer is then capable of deleting these blank spaces, by means of a skipping function that is implemented in a printer buffer. The printer buffer simply deletes portions including only blank spaces from the print data before the actual printing.

However, it is a drawback of such a method that it does not provide much flexibility. Since the skipping is performed on the level of the print data, there is only the possibility of omitting a portion of the unused area, and no more adaptation to the layout, such as improved readability, can be made. Moreover, a more complicated operation of the printer as compared to usual printers is necessary.

SUMMARY OF THE INVENTION

The present invention aims to provide an improved method for adapting the layout of contents to be printed in a printing environment where the amount of contents to be printed varies, and a respective system.

This is achieved by the features of the independent claims.

According to a first aspect of the present invention, a computer-implemented method for adapting the layout of contents to be printed on a print medium is provided. The method comprises the step of receiving layout data defining the layout of the contents to be printed. The layout data includes size and alignment data for one or plural fields in which text and/or graphics are to be printed. The method further comprises the step of receiving text and/or graphics data to be printed for each of the fields. The method further comprises the step of determining any blank areas within the fields and/or between fields that remain unused for printing in accordance with the received layout text/graphics data and that exceed a predetermined maximum size of blank areas. Still further, the method comprises the step of modifying the layout data so as to reduce said blank areas in accordance with the predetermined maximum size.

According to a second aspect of the present invention, a computer based system for adapting the layout of contents to be printed on a print medium is provided. The system comprises an input means for receiving layout data defining the layout of the contents to be printed and for receiving text and/or graphics data to be printed for each of the fields. The layout data includes size and alignment data for one or plural fields in which text and/or graphics are to be printed. The system further comprises a processing means for analyzing the received data and determining any blank areas within the fields and/or between fields which remain unused for printing in accordance with the received layout and text/graphics data, and that exceed a predetermined maximum size of blank areas, and for modifying the layout data so as to reduce said blank areas in accordance with the predetermined maximum size.

It is the particular approach of the present invention to adapt the layout to an amount of content to be printed before the actual print data to be used by the printer is generated. For this purpose, areas of the print medium which remain blank based on a received layout data and contents to be printed are determined and the layout data are modified to reduce said blank areas. Upon reduction of the blank areas, for example, the size of the print medium can be reduced to enhance cost efficiency, or the font size can be increased to improve readability.

In accordance with preferred embodiments, a reduction of the paper size is achieved by a reduction of the size of at least one of the fields, and/or by a reduction of blank areas between fields.

Also preferably, the layout data are modified so as to enlarge at least one of the fields to be printed in. For instance, the printing area (size) of a print field can be enlarged, while the size between print fields (blank space) is reduced. Based thereon, the font size of the text or the size of graphics to be printed in the print field can be enlarged to increase the readability of the printed contents. Also, in accordance with the preferred embodiment, the size of a field is not reduced even if the determining step determines that a blank area in said field exceeds the predetermined maximum size. In accordance with said preferred embodiments, more preferably, the contents to be printed in the respective field are reformatted. More preferably, at least one of the font sizes of the text to be printed in said field or the size of a graphic to be printed for said field in accordance with the received text and/or graphics data is enlarged. Hence, by an enlargement of the respective size of text/graphics, the contents need more space to be printed on, which automatically reduces the size of blank spaces.

Also, according to a preferred embodiment, the step of modifying the layout data does not modify the relative orientation of the plural fields with respect to each other. Also, preferably, the aspect ratio of the fields is not modified by modifying the layout data.

Preferably, one or more parameters of the layout data are set via a computer generated user interface. Such a user interface enables a user to influence the layout of the printout and the handling of particular situations, in view of the specific properties of the received text/graphics data in a simple and intuitive manner, without requiring knowledge of a specific or proprietary parameter syntax. More preferably, the user interface is a text-based graphical user interface that includes one or more prompts for setting one or more parameters. Also preferably, via the same user interface, parameters defining properties of the text and/or graphics data to be printed can be set. Also, a possibility exists to override one or more of the parameters which are set through the user interface in the step of modifying the layout data. This means that some parameter, for instance a parameter defining a space between two print fields or parameters defining the height of a print field, will be cancelled and replaced by a parameter which is automatically set in the layout modification, in order to reduce a blank space. Also, preferably, the user interface is adapted to set said predetermined maximum size of blank areas. This has the advantage of allowing the user flexibility as compared to a case wherein the maximum size of blank spaces (in particular: maximum height and/or width of blank space) is set fixed.

Also preferably, a user can define, via a specific parameter in the user interface, for a particular pair of fields, that the distance between said fields remains constant in the layout modifying step. For instance, in a particular situation, it may not be meaningful to decrease the distance between two particular fields (i.e. to bring these fields nearer to each other) although there is a considerable blank space between them, if this would, for instance, affect the overall intelligibility or aesthetic appearance of the printout in a negative manner.

Preferably, the layout data are stored in a database which forms part of the system according to the present invention. More preferably, the modified layout data obtained by modifying the layout data are stored back in said database.

Preferably, the computer system according to the present invention further comprises an interface with a printing device. Through said interface, the printer is provided with the text and/or graphics data and the modified layout data. The actual print data can be generated from the text, graphics and modified layout data directly in the printer. Alternatively, they can be generated in an external computer performing the modification step and forwarded to the actual printer already in the form of print data usable by the printer.

Further features and advantages of the present invention are set forth in dependent claims.

BRIEF DESCRIPTION OF THE DRAWINGS

Additional features and advantages of the present invention will become apparent in the following and more particular description as illustrated in the accompanying drawings, wherein.

DETAILED DESCRIPTION

Figure 1:
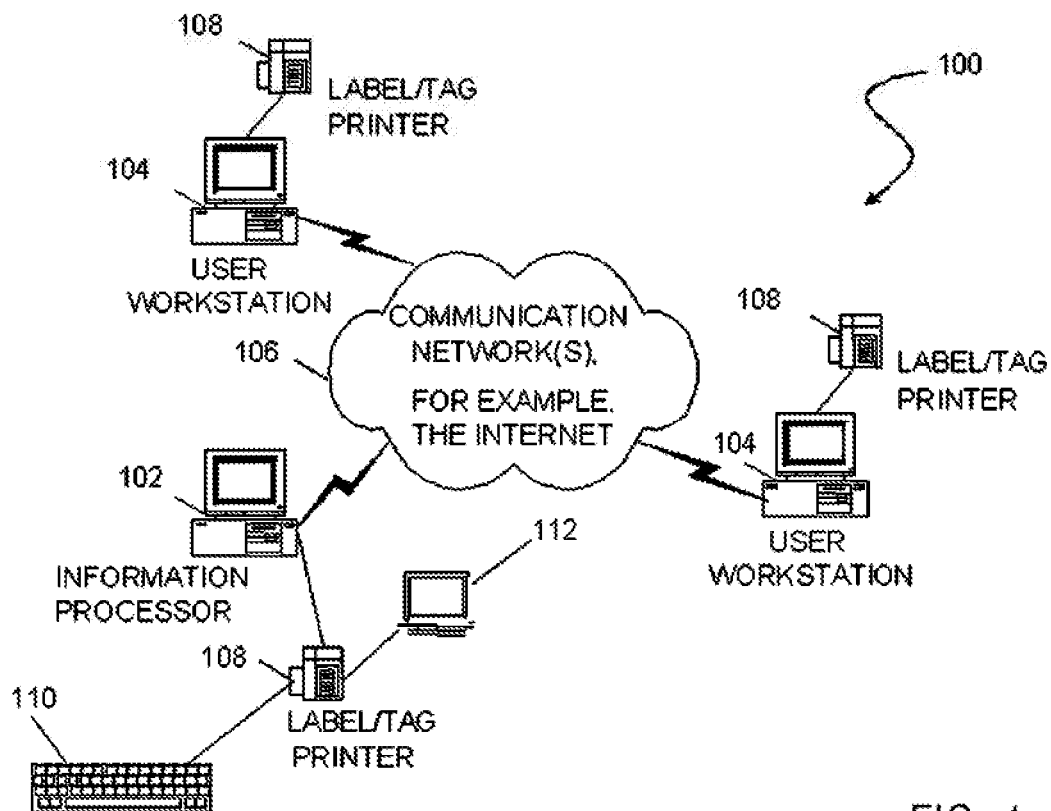
FIG. 1 illustrates an example hardware arrangement, which can be used for implementing a computer-based system in accordance with the present invention.

The present invention provides a system and computer-implemented method for flexibly adapting a layout of contents to be printed so as to optimize usage of available paper resources, minimize the usage of paper and increase the readability of the printed contents, by minimizing areas that remain unused for printing (blank). Moreover, embodiments of the present invention provide a computer-implemented graphical user interface which allows a user to set and modify parameters for defining and adapting the layout.

In the following, a detailed description will be given with reference to the figures of the drawings, in which like reference numerals represent like elements.

FIG. 1 illustrates an exemplary hardware arrangement of a printing environment, in the framework of which the present invention is employed, which is generally referred to as system 100.

System 100 preferably comprises at least one computing device (information processor 102 and/or user workstation 104). In particular, an information processor 102 may be configured to operate as an Internet web server and database file server and be programmed and configured to access communication network 106 and communicate with other computing devices such as workstations 104. Computing devices 102 and 104 may communicate via the known communication protocols such as transmission control protocol/Internet protocol (TCP/IP). Via the communication network 106, remote server configurations such as those on the premises of vendors or distributors of printer firmware and other resources can get access (not shown) to system 100. Both information processor 102 and user workstations 104 are examples of computing devices, on which a computer-implemented method for adapting the layout of content to be printed in accordance with the present invention can be running. In particular, the computing devices may include an input means and a processing means according to the present invention.

Information processor 102 may further be provided with an integrated development programming environment (IDE) so as to develop applications. A person skilled in the art is aware of IDE development tools. Further details are not essential for the present invention and are therefore omitted herein. For instance, applications can be developed in a scripting language such as the LUA programming language. A LUA scripting language has been designed for portability and renders it possible to run the same applications on multiple platforms. Information processor 102 may also be provided with printer firmware and/or software applications that are installed in any one of printers 108, or which belong to other printers physically not connected to the system 100.

User workstations 104 are preferably mobile devices such as operating one or more of the Android, Iphone or Windows mobile operating systems, Smartphone devices, tablet computing devices or other portable/mobile devices. Moreover, user workstations 104 can be personal computers, mini computers, mainframe computers, laptop computers or personal digital assistants (PDA). In addition, information processor 102 and/or user workstation 104 may operate one or more software applications provided on printing device 108 for remote configuration and/or operation. In this way, software applications can be executed and used to control printing device 108 remotely.

Communication network 106 may be a global public communication network such as the Internet, but can also be a Wide Area Network (WAN), a Local Area Network (LAN), a wireless local area network (WLAN) or an intranet or other network that enables computing devices and peripherals to communicate and to have access to remote sites via a global network such as the Internet.

Printers 108 are preferably label and tag printers and operable to print labels and tags of data received from computing devices 102/104. A printer 108 may either be directly connected to a particular computing device or workstation, or may be a web printer that is accessed from a computing device 102 or 104 via communication network 106. Finally, a user workstation 104 may be integrated with a printer 108 so as to form a single unique device (not shown). Printer 108 may be provided with keyboard 110 and display 112 to enable input and output functionality with the printer 108, in addition to or in the absence of or in conjunction with computing devices 102 and 104. Keyboard 110 and display 112 may be external devices not directly coupled to printer 108, or may form an integral part of the printer 108 themselves. Preferably, the display supports a wide selection of fonts and coding types, for example, for many different written languages.

A computing device 102/104 and a printing device 108 are configured to communicate (e.g. via USB (Universal Serial Bus), Bluetooth, Wi-Fi, 3G or other suitable connectivity) and the transmission and reception of commands such as bitmap or SBPL (Sato Barcode Programming Language) commands enable the printing device to operate in accordance with one or more applications.

A printer within the framework of the present invention may also be a stand-alone printer, which is capable of operating (printing) without having any physical connection (wireless or by wire) to a computing device. In this case, print data that have been prepared on the basis of text/graphics data as well as layout data have to be provided with the printer in advance, such as by some temporary connection which is disconnected before the actual printing occurs, or by means of exchanging portable storage media such as USB memory sticks, USB cards or others, between a computing device 102/104 and a printing device 108.

Figure 2:
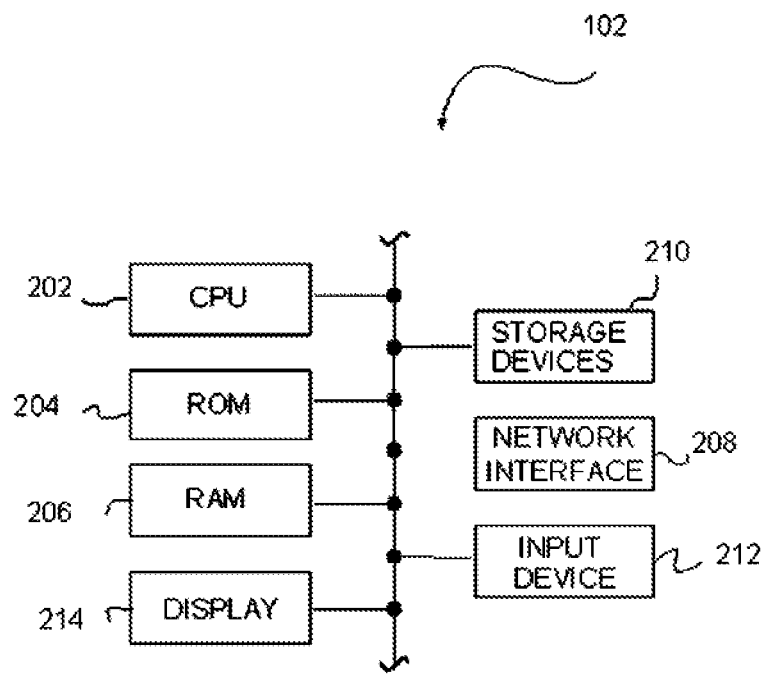
FIG. 2 illustrates the functional elements of an example information processor or user workstation shown in FIG. 1.

FIG. 2 illustrates one or more functional elements of an example computing device 102/104. The computing device includes one or more central processing units (CPU) 202 used to execute software coded control operations. Other elements shown in FIG. 2 include read-only memory (ROM) 204, random access memory (RAM) 206, one or more networking interfaces 208 to transmit and receive data to and from other computing devices across a communication network, storage devices 210 such as hard disk drive, floppy disk drive, tape drive, CD-ROM, DVD, SD card or USB memory stick for storing program code databases and application data, one or more input devices 212 such as keyboard, mouse, trackball, microphone and the like, and display 214. Further, one or more functional elements 202 to 214 may be suitably configured or provided with printer 108, as well.

Various components illustrated in FIG. 2 need not be physically contained within a single device chassis or even located in a single location. For example, storage device 210 may be located at a site that is remote from the remaining elements of information processor 102, and may even be connected to CPU 202 across communication network 106 via network interface 208.

Information processor 102, computing device 104 and/or printing device 108 may include a memory equipped with sufficient storage, so as to provide the necessary databases for access, forums and other community services communicating Hypertext Markup Language (HTML), drivers, applets or Active-X control programs. CPU(s) 202, network interface(s) 208 and memory and storage devices are selected to ensure that capacities are arranged to accommodate expected demand.

The nature of the invention is such that one skilled in the art of writing computer executable code (i.e. software) can implement the functions described herein using one or more of a combination of popular computer programming languages, scripting languages or developing environments including but not limited to LUA, C, C++, Visual Basic, JAVA, HTML, XML, Active Server Pages, JAVA server pages, servlets, MYSQL and PHP.

Although the present invention is described by way of example herein and in terms of a web-based system using web browsers and a website server (e.g., information processor 102), system 100 is not limited to such a configuration. It is contemplated that system 100 is arranged in such a way that label and tag printer 108 communicates with and outputs data received from computing device 102/104 using any known communication method, for example, using a non-Internet browser Windows viewer coupled with a local area network protocol, such as the Internet Package Exchange (IPX), dial-up, third party, private network or a value added network (VAN).

It is further contemplated that any suitable operating system can be used on computing device 102/104, for example, various Windows operating systems, MAC OS, Unix, Linux, Palm OS, pocket PC, Blackberry, Android and others.

Figure 3:
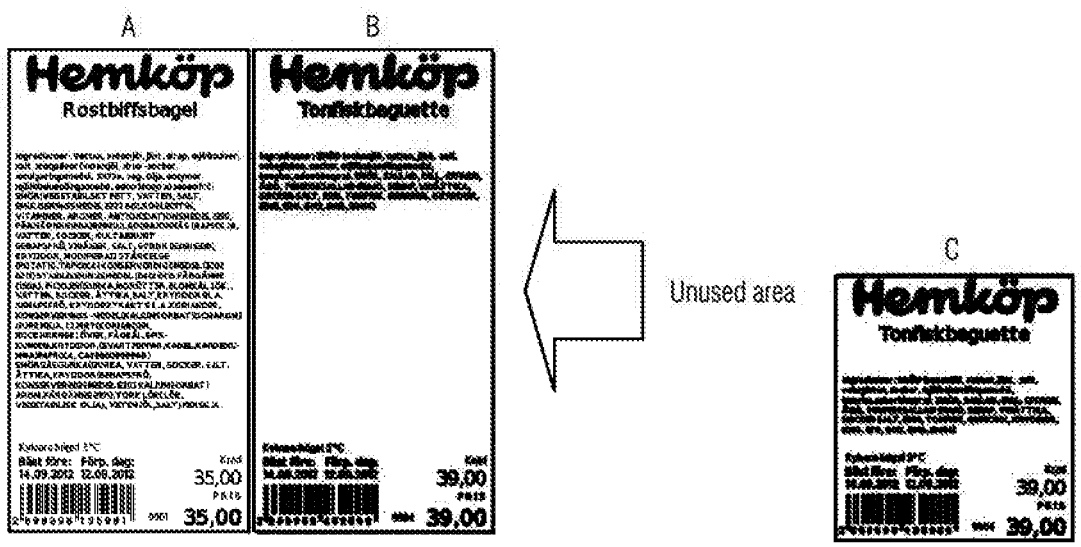
FIG. 3 provides an illustration of the basic problem underlying the present invention and the result of the solution in accordance with the present invention.

FIG. 3 generally shows a problem underlying the present invention. The figure shows three different labels named "A", "B" and "C" printed out and used in a shop for showing information related to some product which is sold in the shop. In particular, the information printed on the labels includes a listing of ingredients of some product. It has to be noted that labels illustrated in FIG. 3 have been provided to illustrate a specific, layout related problem underlying the present invention only, and the text (which is in Swedish in the given example) is not intended to be read or understood.

Generally; in a conventional system for generating and printing labels such as those illustrated in FIG. 3, a label size for a customer is selected so that the largest amount of text that a customer will use can be printed on the label in the framework of a predetermined layout. In particular, the layout includes a desired point size for each of different portions of text to be printed (in FIG. 3: in particular, the portion listing the ingredients, i.e. the central portion of each of the labels).

In many cases, such as for ingredient labels, the content amount of text varies. This means that there will often be an unused white area, in order to comply with the given layout but at the same time provide sufficient space to accommodate the maximum amount of text that may occur in the given situation (e.g. for the different products sold by the particular shop).

In the present case, label "A" relates to a product ("Rostbiffsbagel") which includes a maximum amount of ingredients to be printed on a label. Label "B" relates to a different product ("Tonfiskbaguette"), including a much smaller amount of ingredients, thus having a much shorter description than the list of ingredients in label "A", and also requiring, for a given point size, much less space for being listed. As a consequence, in the given layout, on label "B" there is a rather large white (blank) area between the end of the list of ingredients and the further default text. An arrow labeled "unused area" points to said portion of label "B".

In accordance with the present invention, the computer-implemented layout modification application detects such an unused area and decides whether such an unused area is larger than a given predetermined size (in the example, for instance, the small white stripe between the end of the list of ingredients and the further default text portions in label "A", which is necessary for an appreciable overall design of the label). Then, the layout modification application according to the present invention modifies the predetermined layout, for the particular case of the label including the text of label "B", so as to reduce the white, unused area. The result of the modification of the layout is shown in the illustrated label "C" of FIG. 3. The white space has been reduced in size so as to correspond only to a predetermined minimum size necessary for an appreciable label design. As a consequence, the overall space occupied by the text to be printed on the label is accordingly reduced. Print data, generated on the basis of the layout data and graphic/text data to be printed (i.e. the text and the barcode) are generated for being forwarded to the label and tag printer based on the modified layout of label "C". Preferably, an instruction to the label and tag printer to cut off a portion of a continuous medium to be printed behind the last line of print data (i.e. in correspondence with the actual print size of the label) is also provided. This data may be included in the print data prepared on the basis of the modified layout, or can be given to the printer 108 as a separate instruction, to always cut off a portion of the continuous medium at the end of each label. It is also possible within the present invention that a user manually divides the continuous medium into separate labels, at each position corresponding to an end of a label, respectively.

As a consequence, the physical size of an individual label can be reduced together with the size of the unused area: The result (label "C" as compared to label "B") saves money protects the environment and has a better appearance for the end user.

Figure 4A:
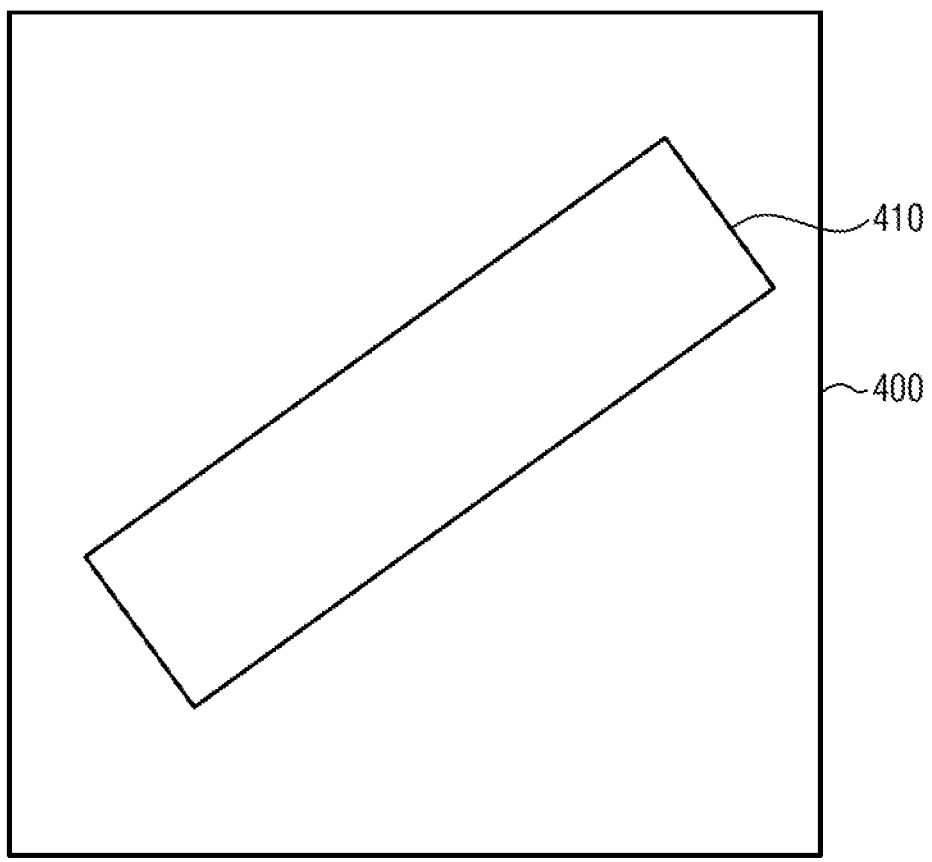
FIGS. 4A-4F illustrate an exemplary step-by-step procedure for generating and modifying a layout in accordance with the present invention.
Figure 4B:
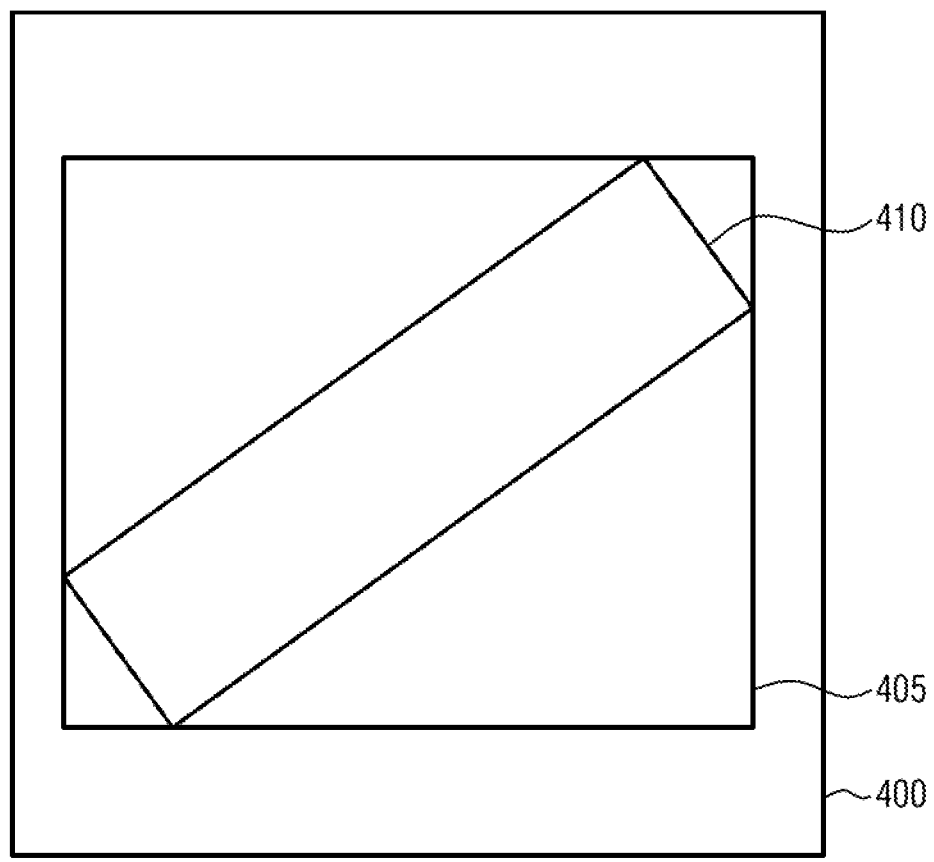
Figure 4C:
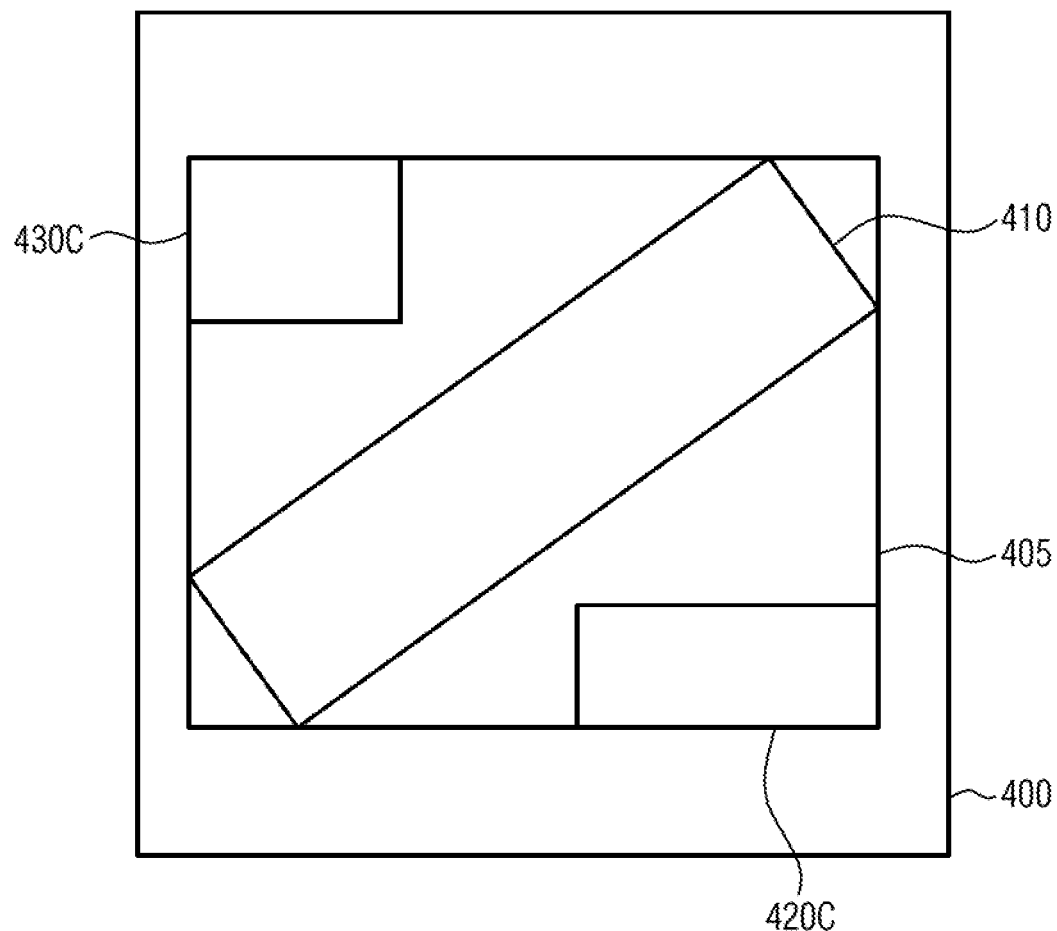

FIGS. 4A to 4F illustrate a procedure for generating a layout to be printed, and modifying the layout in accordance with an embodiment of the present invention. The layout for printing a portion of paper such as a label 400 includes a plurality of fields (410, 420, 430) to be printed on. As will be illustrated in following figures, in particular, such fields may be text fields, for printing particularly designated portions of text therein. The arrangement of such text fields may vary. In particular, text fields may be provided for printing texts therein in a horizontal manner, as well as in a diagonal manner, for instance, in the case of advertising text to be printed so as to be particularly noticeable. In FIG. 4A, a diagonal field 410 is shown a label 400, thereby defining a first essential element of the layout of label 400. In FIG. 4B, it is further defined that there is a rectangular frame 405, the boundaries of which are collinear with the borders of the label 400, surrounding diagonal field 410. FIG. 4C adds two additional layout elements, in the form of rectangular areas 420C and 430C. In particular, each of these elements may be a text or graphics field in which some predetermined text or graphics has to be printed.

Figure 4D:
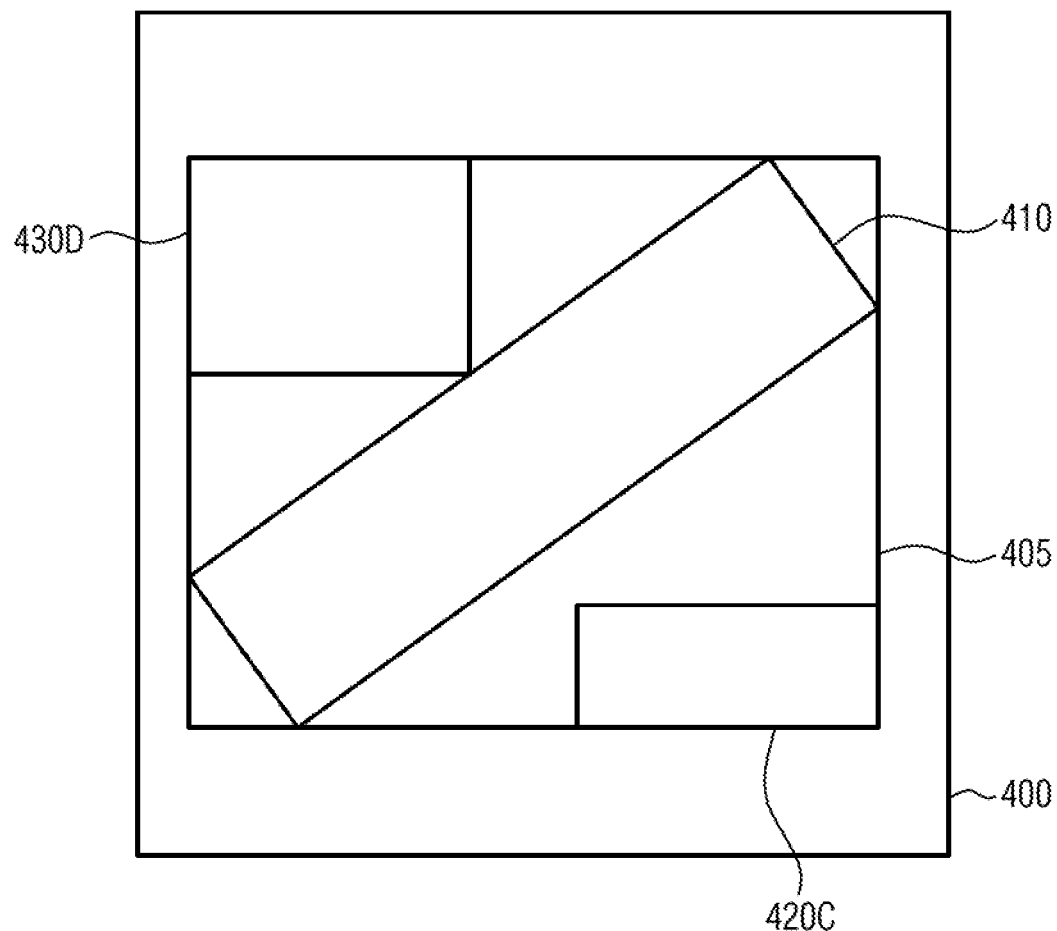

The layout shown in FIG. 4C corresponds to the initial layout data which are set (e.g. by a user), for instance based on some initially given amount of text/graphics to be printed. The computer-implemented layout modification information in accordance with an embodiment of the present invention, after receiving said layout data and the respective text/graphics data to be printed, determines whether there is any unused white space exceeding a predetermined maximum size of white space. In the present example, it is assumed that text/graphics shall only be printed within the fields labeled 410, 420C and 430C, but not in the remaining portions between said fields. Further, in the present example, the predetermined maximum size of acceptable blank areas is defined in such a way that in an area, where two individual fields come closest to each other, there should not be any free space between the individual fields (but, of course, no overlap thereof is acceptable either, which might affect the legibility of the text to be printed therein). Hence, the application determines that there is extra free space between each of fields 420C and 430C and diagonal 410. As a result, the respective unused (white) spaces are reduced so as to be decreased, as long as the fields do not overlap. FIG. 4D illustrates the reduction of white space between fields 410 and 430C. As a consequence, field 430C is enlarged and becomes the size of field 430D illustrated in FIG. 4D, touching field 410 at one point without overlapping. Field 410 remains unchanged, since any enlargement thereof would extend the field beyond frame 405, which has been set fixed in the given layout.

Figure 4E:
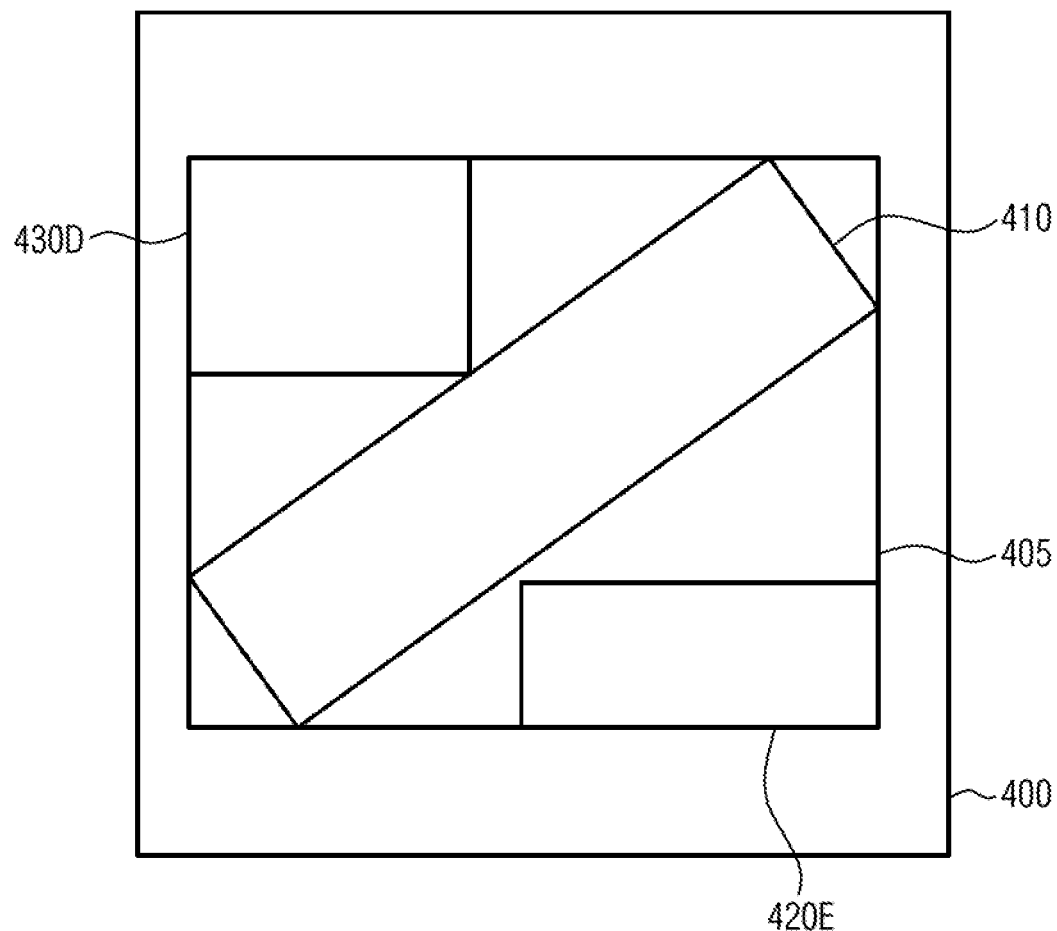
Figure 4F:
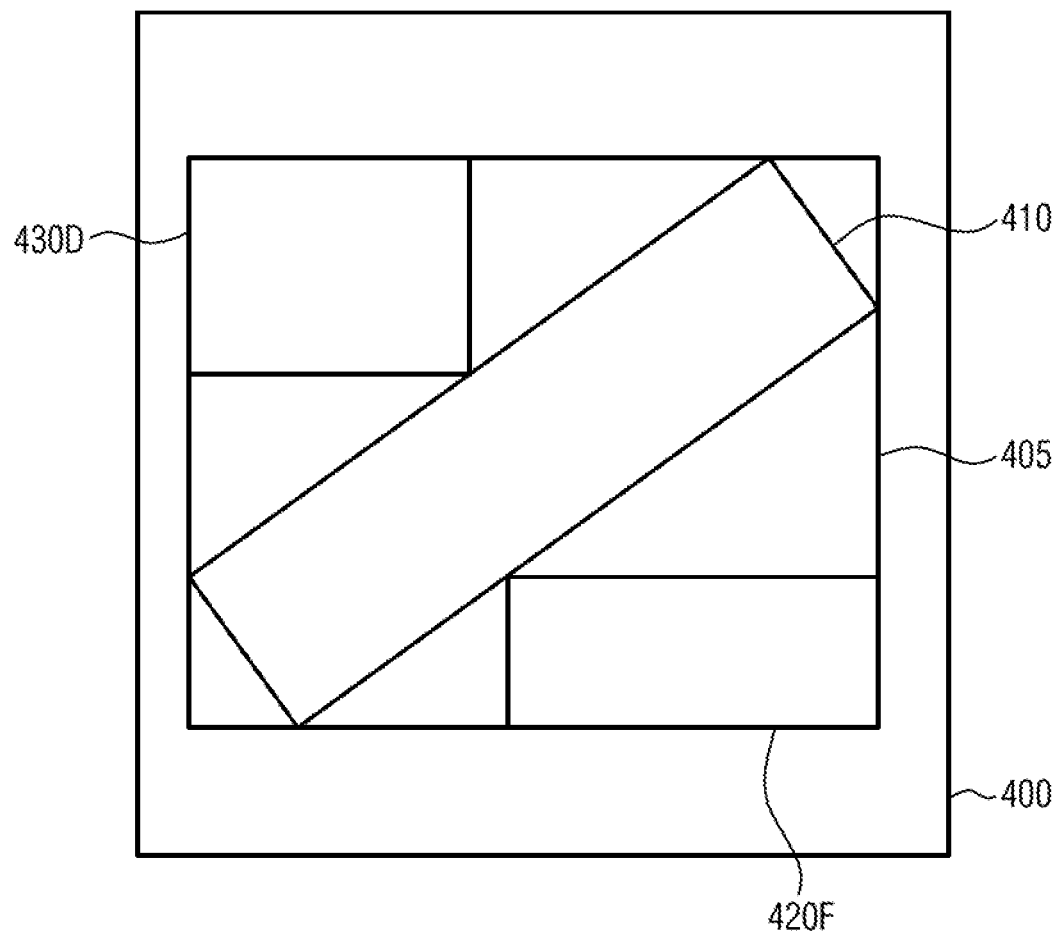

In the same manner, field 420C is enlarged so as to minimize the unused space between fields 420 and 410. FIG. 4E shows an intermediate result, wherein the size of field 420E has been reduced, but the minimum size thereof has not yet been reached (i.e. field 420E does not yet "touch" field 410). The final result is shown in FIG. 4F. Field 420F now "touches" diagonal field 410, in the same manner as field 430D touches field 410. As a consequence, the size of fields 420F and 430D has been increased as compared to the respective original fields, 420C and 430C. As a result, for instance, the font of the text to be printed in these fields can be enlarged, while the amount of text remains constant. Hence, in summary, the reduced unused white space can be used for increasing the legibility of text to be printed in fields 420 and 430. Of course, the enlargement of fields 420 and 430 could also be used in a similar manner for enlarging graphics to be printed therein or for accommodating more text while keeping the font size unchanged.

A skilled person is aware that the example illustrated with reference to FIGS. 4A to 4F is purely by way of example only. Many different particular situations can be envisaged within the framework of the appended claims.

For instance, as will be explained below, a plurality of parameters can be set (preset) controlling the behavior of the layout modification application. For example, in the given situation i.e. starting from the situation of FIG. 4C, the modification of the layout for reducing the white space by enlarging fields 420C and 430C until they touch field 410 is not unambiguous. In the given example, the enlargement is performed under the constraint that the aspect ratio of height and width of each of fields 420C and 430C is not changed during the enlargement. Of course, other constraints would be possible, such as defining a constraint according to which the width (or, alternatively, the height) of each of the fields remains unchanged (constant), in the enlargement.

Another particular example of modifying a layout in accordance with the principles of the present invention will be described below with reference to FIGS. 5A to 5H.

Figure 5A:
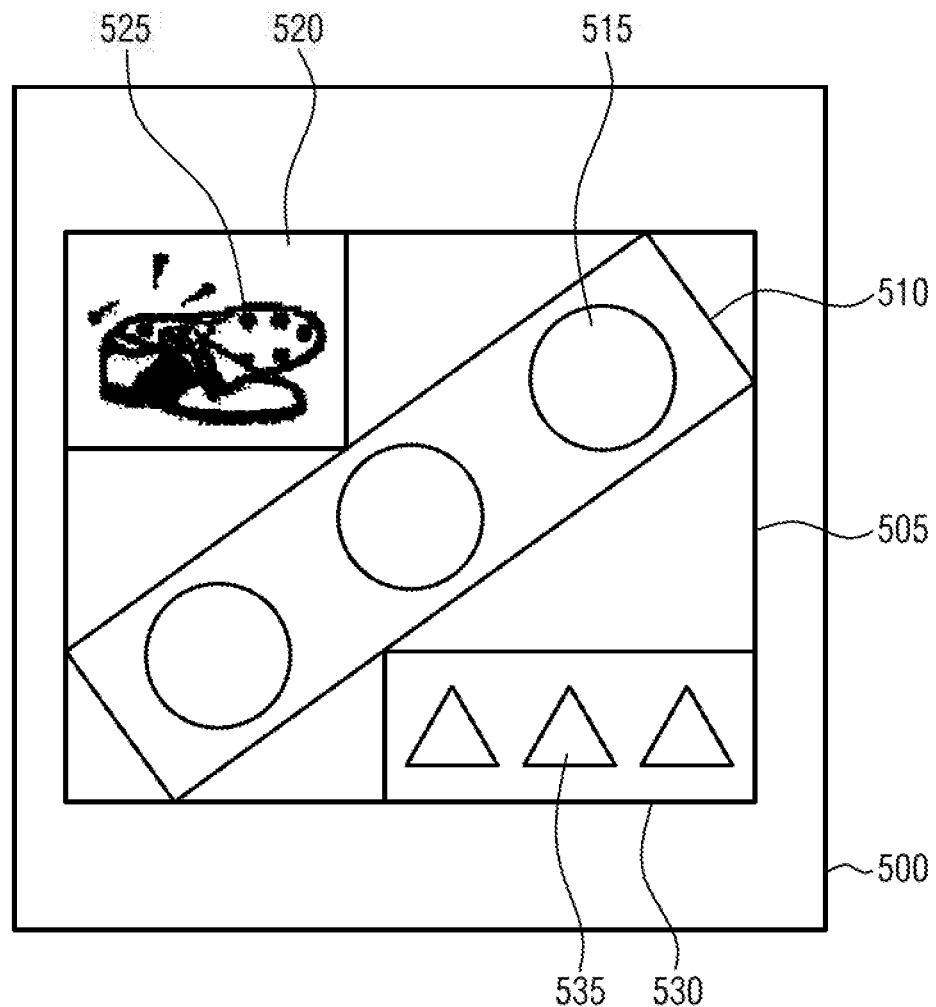
FIGS. 5A-5H illustrate another exemplary step-by-step procedure for modifying a layout in accordance with the present invention.

FIG. 5A shows an exemplary label 500 to be printed. The layout of the label illustrated in FIG. 5A substantially corresponds to the layout of FIG. 4F, i.e. with the amount of white space being reduced as compared to the layout of FIG. 4B, i.e. before the modification procedure of FIG. 4. However, in addition to FIG. 4F, FIG. 5A also schematically illustrates contents of the printing areas of the label.

More specifically, in FIG. 5A there are three rectangular fields to be printed on: a diagonal field (510) and two fields (520 and 530) the boundaries of which are aligned with the edges of label 500. The upper left field 520 is a graphic field for printing a graphic therein (in the present example illustrated by means of a picture 525 showing a pair of shoes). Diagonal field 510 and lower right field 530 are text fields. The text to be printed therein is only schematically illustrated by means of circles 515 in text field 510 and triangles 535 in text field 530. The circles 515 and triangles 535 are intended to provide a representation of an amount of the text to be printed and a font size. Similarly to FIG. 4F, the text fields are surrounded by rectangular frame 505 the boundaries of which are collinear with the borders of label 500.

Figure 5B:
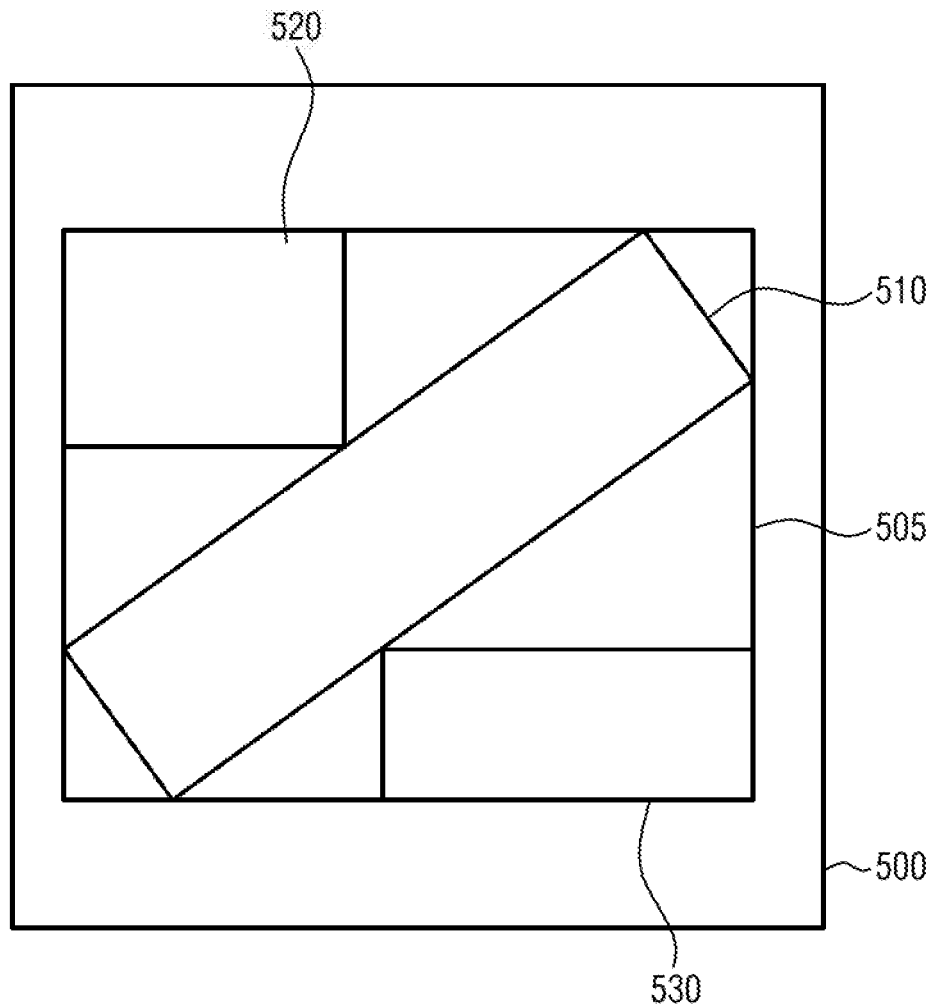

In the present particular example, it is intended to illustrate how the layout modification method of the present invention may be employed to adapt the layout in case it is necessary to print more text in diagonal field 510, i.e. the amount of text to be printed in text field 510 increases, and as a result of the modification the white space is reduced. This can be seen from FIG. 5H showing the final result of the layout modification. In the respective diagonal field (510C of FIG. 5H) there are five circles 515H (as compared to only three circles 515 in FIG. 5A), thereby representing an increased number of letters/words of the text.

For sake of convenience, the explanation of the layout modification itself will be made with reference to FIGS. 5B to 5G, in which the illustration of the contents is omitted. FIG. 5B illustrates the layout of FIG. 5A without illustrating the print contents 515, 525 and 535. Hence, FIG. 5BB substantially corresponds to FIG. 4F. While FIG. 4F represents the final result of the layout modification procedure in FIG. 4, FIG. 5B serves as the starting point of the explanation of the layout modification in FIG. 5.

As explained above, in the present example it is assumed that more text is to be accommodated in diagonal text field 500. However, it is a condition that diagonal field 510 shall remain within the width of frame 505 which represents in the given example the right and left boundaries of an overall printing width, i.e. the width area where the printer can, in principle, print. The width of frame 505 is determined by the technical characteristics of the printer (such as the width of the printer head) as well as the width of the label/tag selected by the user in advance (for instance a continuous label roll such as a receipt) and cannot be extended. This is also not desirable since for reasons of aesthetics there should always remain some non-printed margin on each label. Hence the length of field 510 cannot be substantially extended. Consequently, the size of the text (size of the font) must be decreased in order to be able to accommodate the increased text amount. As a result (since in the present case it is assumed that no line wrapping is desired/allowed), there remains an unprinted area in the height extension of field 510. In other words, an extra white space occurs above and below the text line in field 510, due to the reduction in font size. Therefore it is possible to reduce the height of field 510, thereby reducing the white space.

Figure 5C:
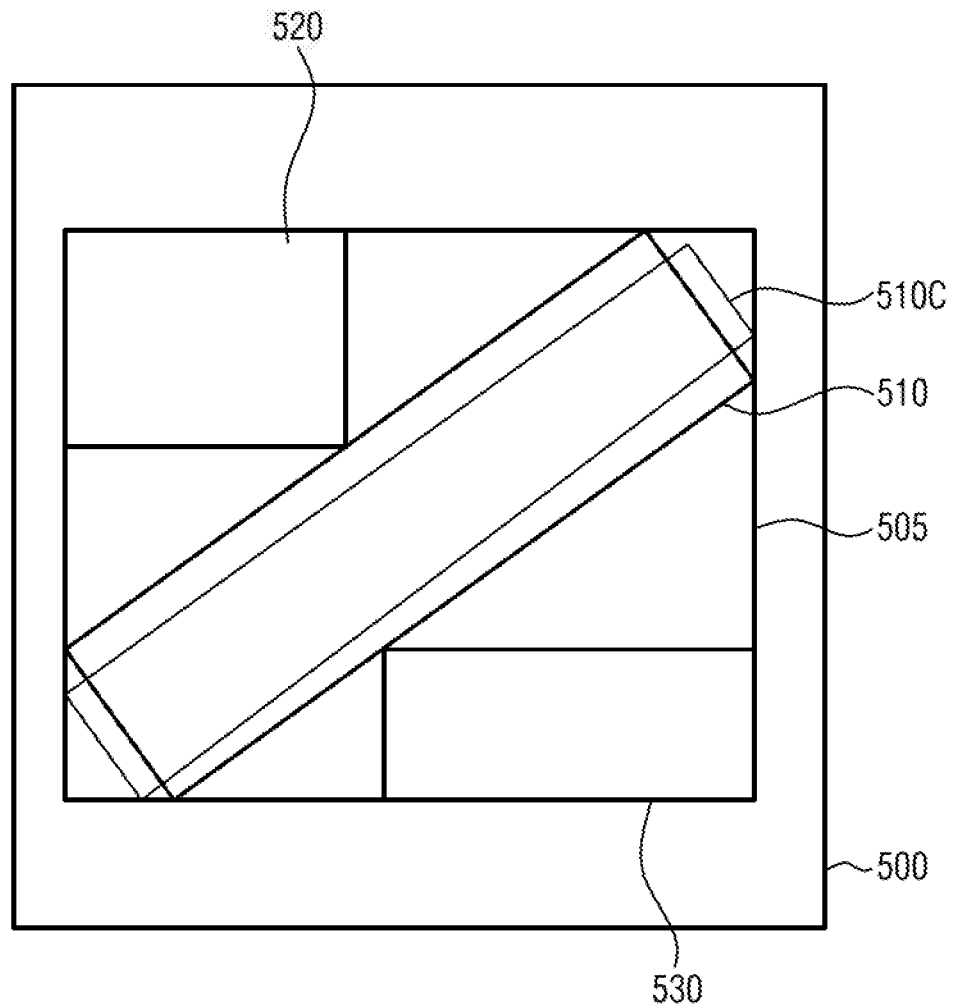

This is illustrated in FIG. 5C. In FIG. 5C, a text field 510C having a reduced height sufficient for accommodating a line of text of reduced font size is illustrated together with the initial diagonal field 510. As can be seen therefrom, the modification from field 510 to field 510C has been made such that the lower and left corners still touch frame 505. As a consequence, the width of field 510C is insubstantially larger than that of field 510 and the upper edge of frame 505 is no more touched by the right upper corner of field 510C.

Figure 5D:
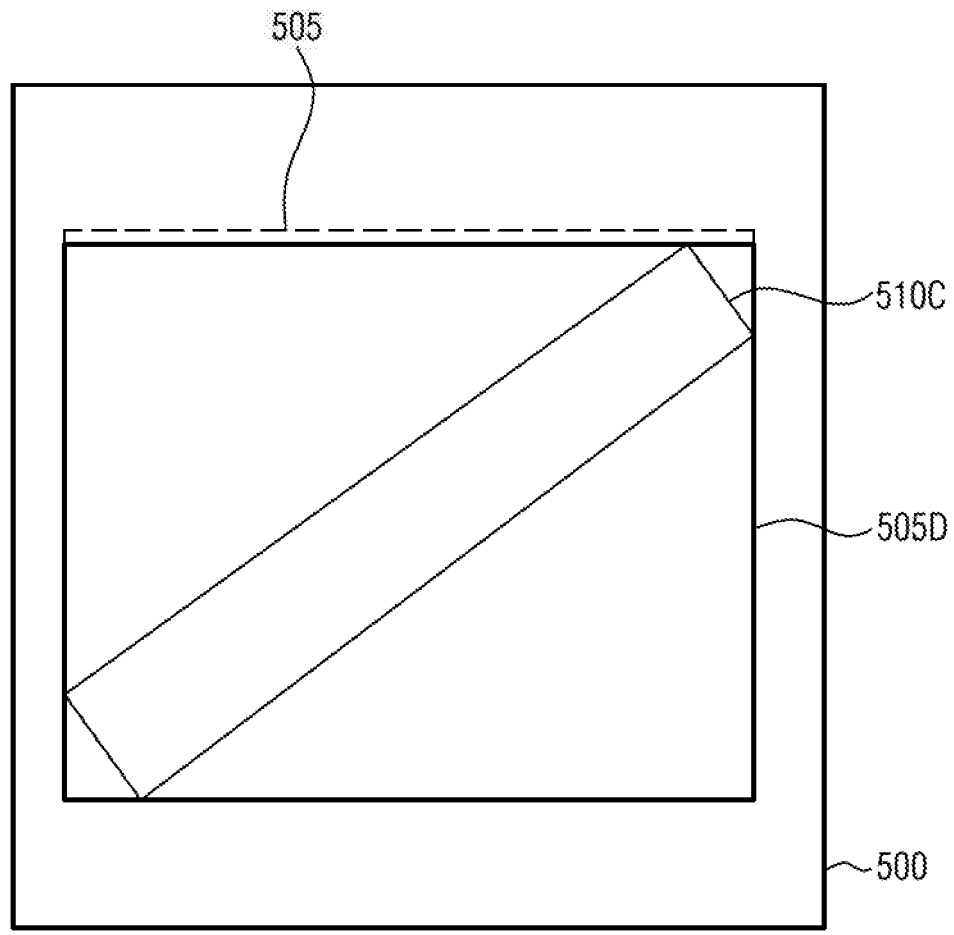

Therefore, a layout modification reducing the overall size of the print area of the label can be performed, by shifting down the upper edge of frame 505 until it (again) touches the diagonal text field. This is illustrated in FIG. 5D. In FIG. 5D the modified (height reduced) frame 505D is shown together with original frame 500. They coincide with the exception of the upper edges (the upper edge of frame 505 is shown dashed in FIG. 5D). For sake of convenience and to simplify the drawing, fields 520 and 530 are not shown in FIG. 5D. Of course, height of field 520 must be slightly reduced at the same time, in order to remain accommodated in new frame 505D. However, this is no problem, since there is sufficient white space above the graphic 525 in field 520 (see FIG. 5A).

Figure 5E:
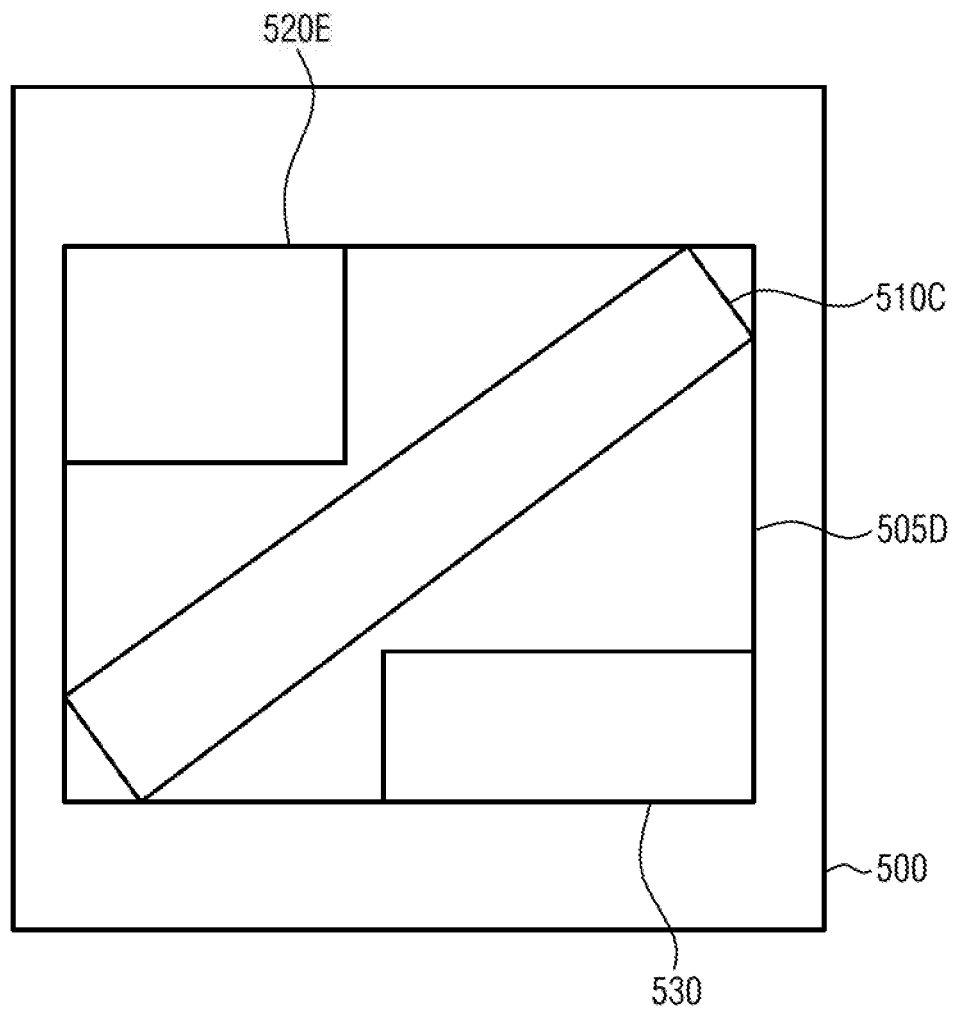

This is illustrated in FIG. 5E, additionally showing a slightly height reduced upper left field 520E and lower right field 530. As can be seen therefrom (and also from FIG. 5C), both the fields aligned with the frame boundary do no more touch the diagonal field. Therefore, it would have been alternatively also possible, not to reduce the height of field 520, but to slightly shift it vertically down for enabling the overall height reduction of the print area (frame size).

Figure 5F:
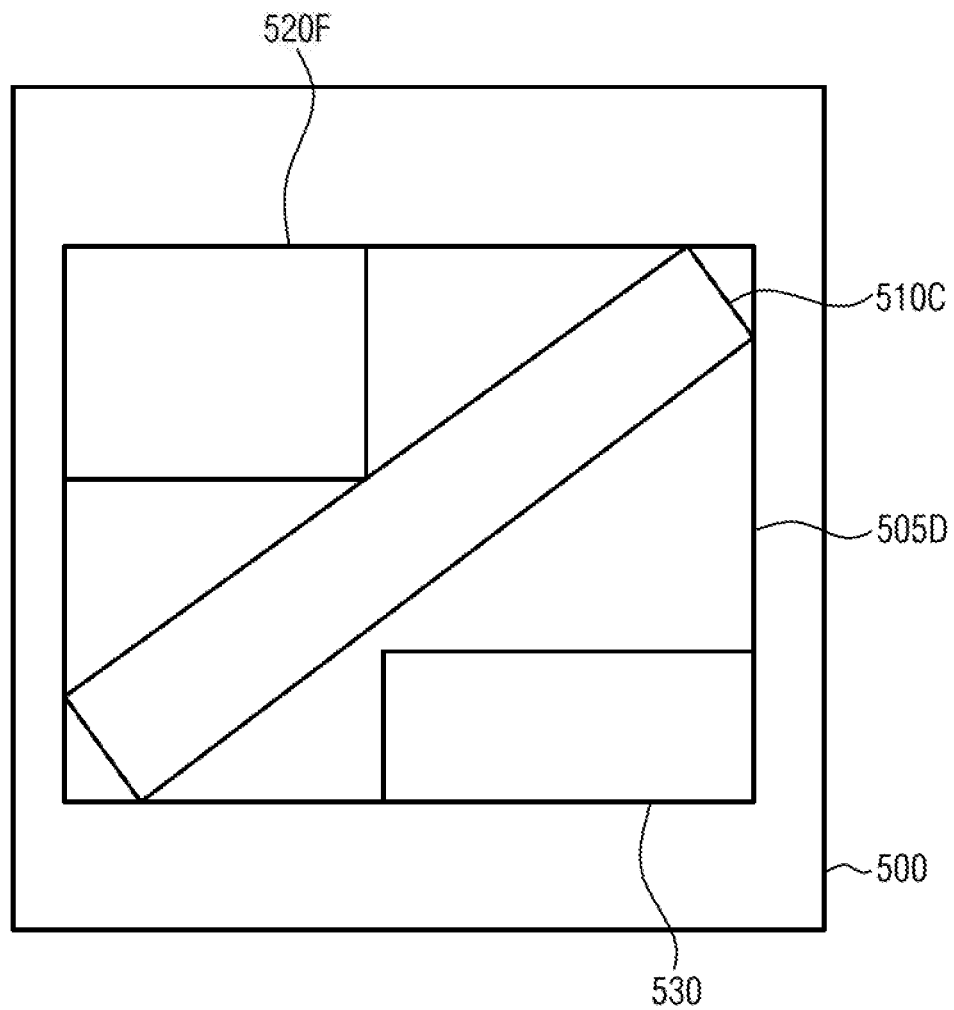
Figure 5G:
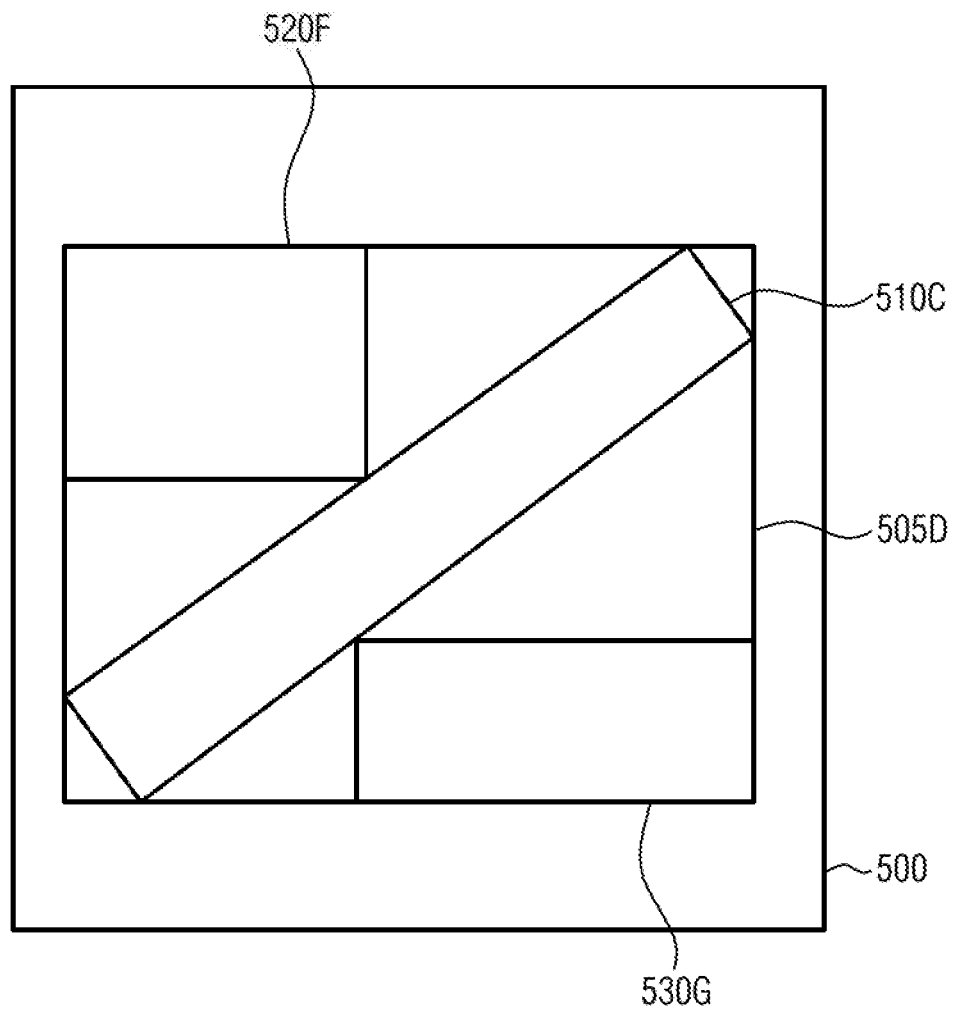
Figure 5H:
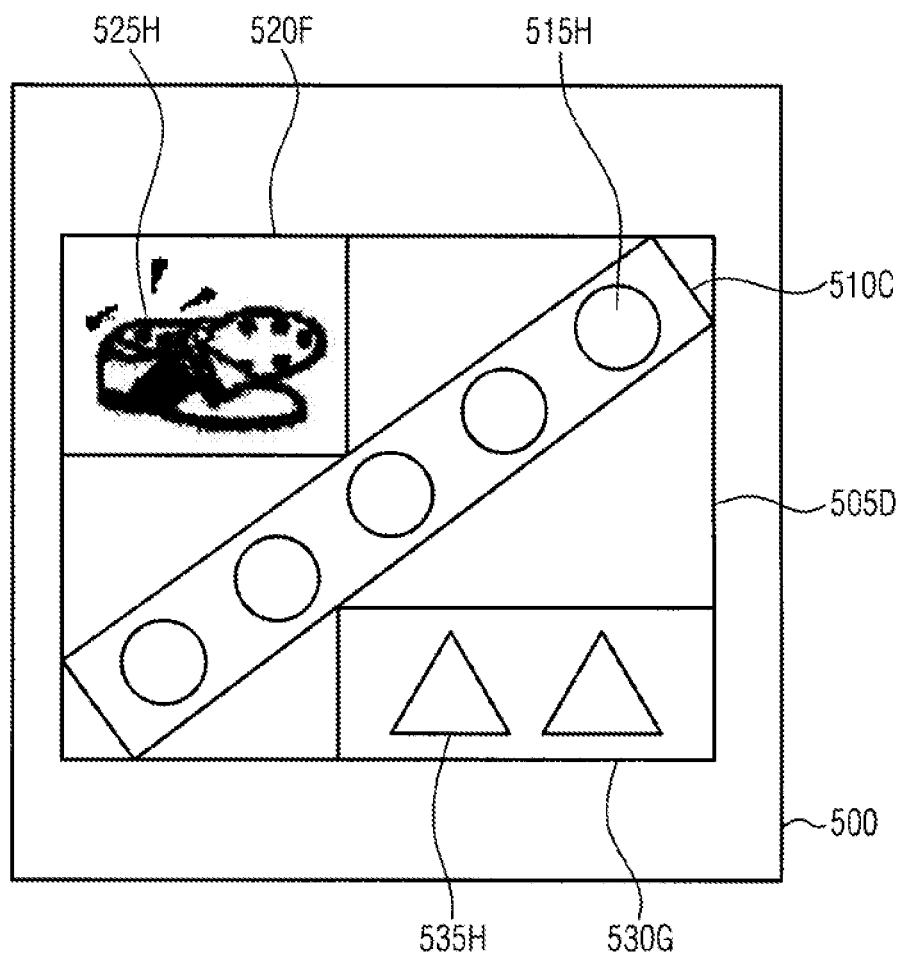

Anyway, a further reduction of white space is possible by expanding fields 520E and 530 so as to touch modified diagonal field 510C. This is illustrated in FIGS. 5F and 5G. In FIG. 5F, field 520E is expanded into field 520F touching field 510. In FIG. 5G, additionally, field 530 is expanded into field 530G touching field 510. The manner in which this is done is the same as explained with reference to FIGS. 4D to 4F above so that a detailed explanation is omitted herein.

FIG. 5G thus represents the final result of the layout modification that has been triggered by an increased amount of text to be printed in diagonal field 510. As a consequence of the white space reduction during the modification, on the one hand, the overall size (height) of the print area 505 has been reduced. Therefore, also the overall size of the print medium can be reduced (not illustrated). If, for instance, label 500 is formed as a part of a continuous roll such as mentioned above, the portion of the roll forming a label can be cut off shorter. On the other hand, height reduction of diagonal field 510C as compared to original diagonal field 510 leads to an increase in size of fields 520F and 530G as compared to original fields 520 and 530, respectively. Therefore, the size of print contents in these fields can be increased to improve readability.

This is illustrated in FIG. 5H. The layout in FIG. 5H is the same as in FIG. 5G but the print contents are again illustrated therein, in a similar manner as in initial FIG. 5A. This concerns the increased amount of text 515H with reduced size in diagonal field 510C. Further, field 520F accommodates graphic 525H of shoes, the size of which has been enlarged as compared to graphic 525. Finally, field 530G accommodates a text 535H with an enlarged font as compared to text 535 of FIG. 5A. It has to be noted that in view of the increased font size in field 530G (due to the increased field height), the amount of text had to be reduced (from three symbols in FIG. 5A to two symbols in FIG. 5F). In the present example this is considered to be not important, for instance if there is only marginal information in the omitted text portion. However, a skilled person is aware that in the framework of the present invention there are other possibilities for modifying the text layout in size expanded fields such as allowing line wrapping (for accommodating more text) or a moderate size enhancement of the font so as to keep the accommodated amount of text unchanged.

Figure 6:
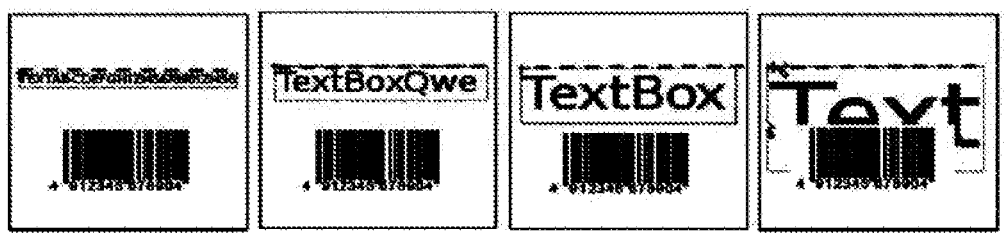
FIG. 6 illustrates a further problem that may occur in conventional layout and printing systems.

Another problem occurring in conventional layout systems for label printers is illustrated in FIG. 6. FIG. 6 shows a sequence of five pictures of labels, each having a field for printing texts in (also called "text box") and a barcode printed thereon. The size of the text box is sequentially increased from the first picture on the left hand side of FIG. 6 to the last picture on the right hand side of this figure. More specifically, the height of the text box is sequentially increased, thereby reducing the white space between the lower borderline of the text box and the barcode. In the given example, at the same time the font size of the text within the text box is enhanced, thereby increasing the readability of the text. However, at the same time, the amount of text in the text box is reduced. A skilled person is aware that in a situation where such an omission of text is not acceptable, "line wrapping" could be allowed by retaining as much text as possible while only moderately increasing the font. In any case, after a certain degree of enlargement has been reached, the text box begins to increase beyond the white space between the text box and the barcode, thereby leading to an overlap with the barcode. Namely, in the conventional example given in FIG. 6, a coordinate position for each layout element (i.e. both the text box and the barcode) is set to be fixed. In other words, given a rectangular shape, with an arrangement aligned with the borders of the label, the position is given by single point, called "insertion point", which can, for instance, be the upper left corner (vertex) of each field.

Figure 7:
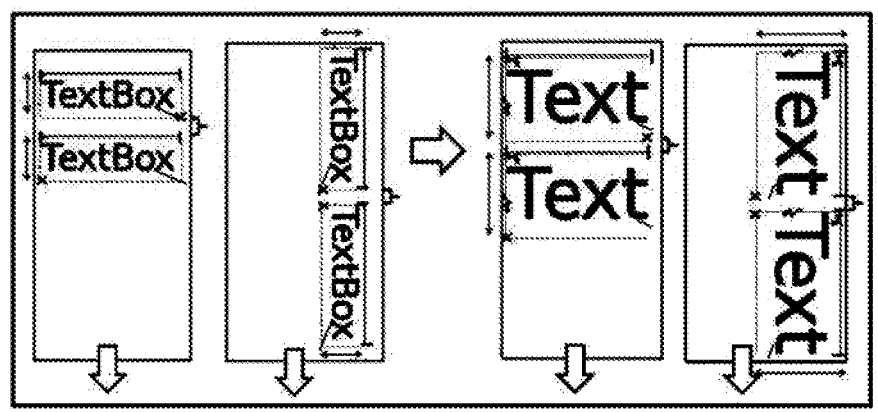
FIG. 7 provides an illustration of the solution to the problem illustrated in FIG. 6 in the framework of the present invention.

A solution to the above problem, given in accordance with embodiments of the present invention resides in the fact that a layout parameter may define keeping the relative distance between several fields of a layout constant, even if the fields are enlarged, reduced or rotated. In other words, while a first insertion point may remain set fixed, the insertion point of a second (next) field is changed so as to keep the distance constant and thus avoid overlapping. Such a situation is illustrated in FIG. 7.

In the context of the present invention, i.e. when a reduction of white space which may, in particular, be white space between fields such as text boxes, is performed, this means that the parameters defining the insertion points does not remain completely constant. Rather, the distance between the fields (unused white space) can be reduced until a predetermined maximum size of blank areas which is acceptable has been reached (cf. the first to the third pictures from the left in FIG. 6).

In FIG. 6, it is assumed that the remaining space between the text box and the barcode in the third picture in the sequence from left corresponds to the allowable predetermined maximum size. In accordance with the present invention, this means that after said size has been reached, no further reduction of the white space is performed. Hence, in accordance with the present invention, a further enlargement of the text box does not lead to the situation, illustrated in the picture furthest to the right in the sequences in FIG. 6, wherein the text box and the barcode overlap. Rather, if a further enlargement of the text box is desired in a particular situation, the insertion point of the barcode would, at the same time, shift down, thereby keeping the distance between the text box and the barcode constant and avoiding overlapping. Hence, in the context of the present invention, the further enhancement of the text box in the third picture of the sequence of FIG. 6 would be handled in the same manner as, for instance, the transition from the first to the third label from the left hand side in FIG. 7.

Figure 8:
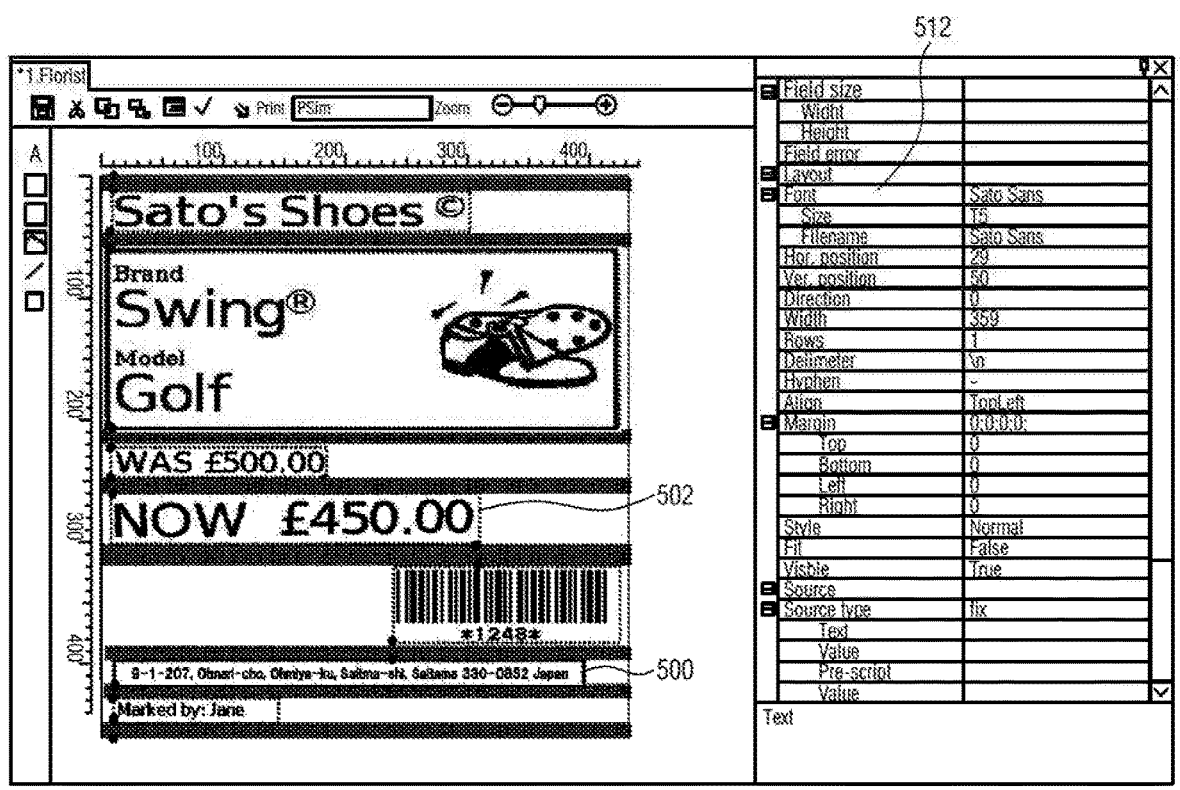
FIG. 8 illustrates a text based graphical user interface together with a respective layout of a label, in accordance with embodiments of the present invention.
Figure 9:
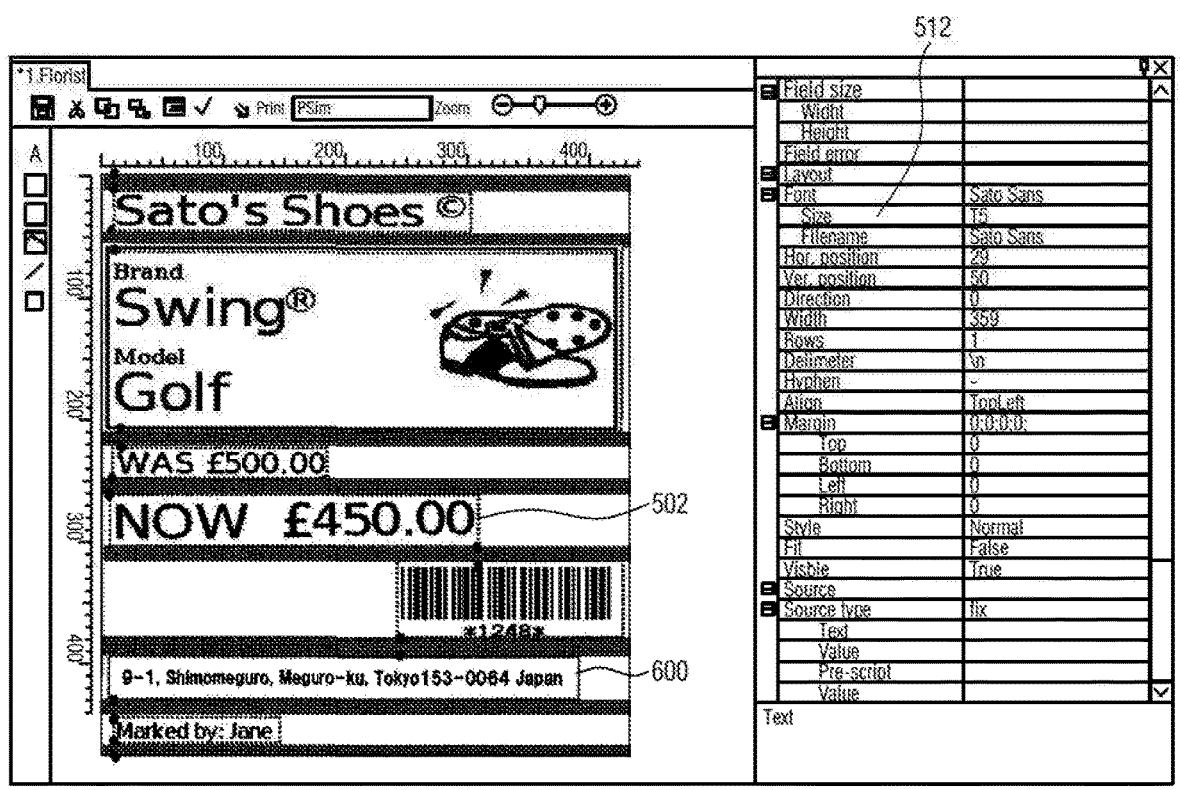
FIG. 9 illustrates a modification of the layout of the label of FIG. 8 within the framework of embodiments of the present invention.
Figure 10:
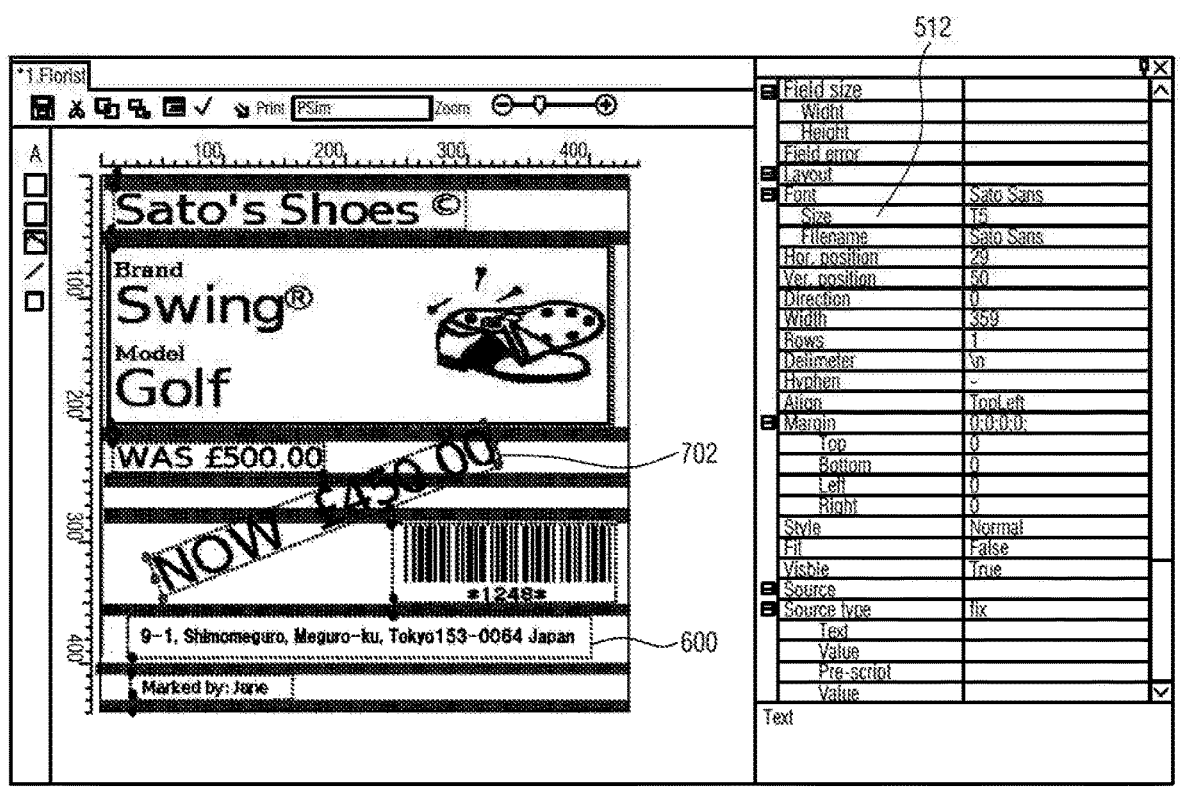
FIG. 10 illustrates a further modification of the label shown in FIG. 9 within the framework of embodiments of the present invention.

Example display screens including a graphical user interface for defining layout parameters of a label (right hand side of the screen shots) together with the illustration of a label layout (left hand side of the screen shots) are shown in FIGS. 8 to 10. On the portion furthest to the left of the screen, a virtual toolbox is provided for a user to insert, for example, text, data fields, barcodes, graphics, lines and/or boxes within the label layout. The currently active section of the graphical user interface is control parameter section 512. Control parameter section 512 is provided to define options (e.g. parameters) for controls selected from the virtual toolbox section. In the example shown in FIG. 8, text box control 500 is selected and, accordingly, the respective parameter options provided in control parameter section 512 apply for the print area of the field 500 exclusively. When another field is selected (and receives the focus), the parameters shown in control parameter section 512 apply for said different field, such as a different text box control, for instance 502.

Continuing with reference to FIG. 8, control parameter section 512 includes options for defining field properties (non-editable in the present example), layout and data sources. A skilled person is aware that the layout and appearance of control parameter section 512, as well as the respective options provided therein, can be provided in many other ways and that the particular configuration and appearance shown in FIGS. 8 to 10 only represents an example. Options provided in the field properties section include, for example, defining an overall size for a data field and for defining a respective field height and width. Measurement units may be selected as well, such as for pixels, inches, centimetres or other suitable units of measurement (not shown). The layout section includes a plurality of parameter values for affecting the appearance and behavior of content provided within a user defined print area. Options include, for example, Font Type, Point Size, Font File Name (e.g., location where a respective font is stored), Horizontal Position, Vertical Position, Anchor (e.g., where text begins), Direction (e.g., which direction text is displayed in), Width (e.g., the width of the user defined print area), Rows (e.g., the number of rows that textual content is entitled to wrap), Delimiter (e.g., a data value representing an end of line or data separation), Hyphen (e.g., optional value to display when words and/or lines are wrapped or broken), Alignment, Margin values including Top, Bottom, Right and Left (e.g., within the user defined print area such as 500 or 502), Style (e.g., for displaying content in particular ways), Fit (e.g., to enable automatic resizing of textual content to fit within specified user-defined print area parameters, and Visible (e.g., whether content within user-defined print areas such as 500 or 502 is displayed).

In an embodiment wherein the Rows parameter in a layout section is set to zero, textual content provided in the user-defined print area (in the present case, print area 500) wraps to as many lines as are required for the complete textual content to be displayed using the selected font type, point size and width values defined in the layout section. Although the respective values will not be affected, the height of user-defined print area 500 automatically adjusts to accommodate the textual content. Alternatively, if the value for "Rows" is set to any value greater than zero, textual content within the print area will then wrap at maximum only the defined number of rows. If the amount of textual content, formatted in accordance with options in the control parameter section 512 exceeds the number of lines defined in the "Rows" parameter, then not all of the text will be displayed or printed. Moreover, if the value in the "Rows" parameter is set to 1 (as in the given example of FIGS. 8 to 10), the textual content will not wrap at all. In accordance with an embodiment, the "Fit" parameter can be set to a value of "TRUE", and cause textual content within the respective user-defined print area such as 500 or 502 will be automatically sized and attempted to fit within the user-defined print area, in accordance with embodiments of the invention. If the parameter "Fit" is set to "FALSE", as shown in the present example of FIGS. 8 to 10, the size of the textual content is precluded from being adjusted to accommodate the user-defined print area. Accordingly, any characters that are provided in the text box that exceed the width of the user-defined pint area will not be displayed. At the same time, no line wrapping is allowed, since the parameter "Rows" is set to the value of 1.

When comparing FIG. 8 with the following FIG. 9, there is the following change: the text in text box 500 of FIG. 7, "9-1-207, Ohnari-cho, Ohmiya-ku, Saitma-shi, Saitama 330-0852 Japan" has been changed to "9-1, Shimomeguro, Meguro-ku, Tokyo 153-0064 Japan" in the text box 600 of FIG. 9. Since the amount of text in FIG. 9 is less than in FIG. 8 (there is a smaller number of characters in FIG. 9 as compared to FIG. 8), the respective text box 500 has been changed to text box 600. In view of this, in text box 600, the font size has been increased as compared to text box 500. Thereby, the readability has been improved by reducing an extra unused area which would occur on the right hand side of text box 600, when the smaller font size of FIG. 8 would have been utilized. However, the increase in the font size leads, at the same time, to an increase in the text box height. The height of text box 600 is larger than the height of text box 500 of FIG. 8. Nevertheless, in accordance with the principles as set forth above with reference to FIGS. 6 and 7, the distances between text fields 600 and the upper and lower next fields (the barcode and the text field "Marked by: Jane") remain the same as in FIG. 8. More specifically, the vertical co-ordinate of the insertion point (the top left point in accordance with the setting of "Anchor" in the layout field of control parameter section 512) remains the same, while the following field "Marked by: Jane" has been shifted down slightly.

In FIG. 10 the following further modification has been performed as compared to FIG. 9. Namely, text box 502 of FIGS. 8 and 9 has been changed to text box 702. Text box 702 includes the same text as previously included in text box 502, but has been placed diagonally in the label so as to be more noticeable. Nevertheless, the distance between diagonal text box 702 and the barcode below (at its top left end) as well as the text box above at its right bottom point, respectively, has remained unchanged as compared to FIG. 9. However, rotated text field 702 has been allowed to touch the field including the graphical representation of the pair of shoes. Namely, the position to remain constant is defined between each field (in the present example: field 702) and the fields just above and below said field.

Summarizing, the user presets, preferably with the help of a graphical user interface such as shown in FIGS. 8 to 10, a plurality of layout parameters. The layout parameters define, in particular, parameters concerning each one of a plurality of fields to be printed in, including text fields (text boxes) and fields for putting graphics therein, such as barcodes. The parameters also include parameters defining the relative position and alignment of several fields on a print medium such as a label. This concerns, in particular, a (maximum allowed) distance from one field to the next field. Based on these parameters, in accordance with an embodiment of the invention, the space between plural fields is automatically decreased (cut), based on the input parameter information (in particular if the distance between two fields exceeds a predetermined maximum allowable size).

The purpose of the present invention is to automatically detect and reduce non-used white area. In accordance with embodiments of the invention, additionally the font size is increased as far as possible to improve readability of the text. Also in accordance with embodiments of the invention, the font size by which an overall size of a label to be printed on can be reduced remains unchanged, in order to save paper. In other words, insertion points of fields are automatically changed, in view of the automatic detection of any extra white space between fields that exceeds the predetermined maximum size.

In the following, an example of a possible operation mode of the present invention will be given based on parameter information input by a user, for instance, through control parameter section 512 after clicking a text box in the layout shown in FIGS. 8 to 10. The following exemplary mode is given by way of example only and is not intended to limit the present invention, and a skilled person is aware of a plurality of different modes which can be set in compliance with the appended claims and the principles as set forth in the foregoing description. For instance, in accordance with a predefined mode, the box width of a field may be defined to be fixed, while the box height of the field is defined as non-fixed. Also, the row parameter is defined as having the value 1 in said mode. As indicated above, this means that there is no text wrapping, i.e. as a single line of text in the respective field only. The first two settings correspond to the mode which has been illustrated above with respect to FIGS. 8 to 10. Also in accordance with the above described exemplary mode, the "Fit" parameter can be set to "TRUE" i.e. in contrast to the setting indicated in FIGS. 8 to 10. Setting the parameter "Fit" to "TRUE" has the consequence that a font size of the textual content can be automatically resized (in particular: decreased), in order to fit into a text box having a predetermined size, i.e. the font size is adapted rather than the text box size. In some cases, it may however happen that there is too much textual content to be accommodated in a print area so that the textual content would be barely readable if the font was decreased to such an extent so as to accommodate the whole text in the given print area. In that case, in accordance with the setting of the parameter defining the box height to be non-fixed, the box height may be exceptionally increased. In a different mode, wherein the box height is fixed together with the box width, an error code and/or message can be displayed to indicate that the textual content cannot be displayed so as to be readable. In that case, a user can, for instance, manually change the "Fit" parameter to "FALSE", thereby allowing at least a part of the text to be displayed.

If the height of a text box is changed, at the same time the text box is prevented from overlapping with another field that lies just below, because the text box just below moves down automatically, thereby keeping the (vertical) distance between the fields and preventing an overlap (cf. modification from FIG. 8 to FIG. 9, wherein the text box "Marked by: Jane" moves below to avoid overlap with the enlarged text field 600 in FIG. 9).

As indicated above, the particular framework, within which the present invention can be advantageously applied, is related to printing on linerless media.

Still more specifically, the present invention is advantageously applicable when a carbon dioxide absorbent is added to a material of the print media such as print media for a receipt, a label substrate, an adhesive layer, or a backing paper in a manufacturing step of the print media.

It is desirable that the carbon dioxide absorbent is constituted from, for example, an inorganic carbon dioxide absorbent, be microparticulated to the nanometer (nm; 1 nm=$10^{-9}$ m) level, and be uniformly dispersed throughout the print media.

For example, the particle size thereof can be, at least, less than 1 μm, more preferably about 10 to 100 nm.

As the carbon dioxide absorbent microparticulated to the nanometer level, for example, a Nano vesicle carbon dioxide reduction additive produced by ACTEIIVE CORPORATION can be used.

While the print media is incinerated in an incineration disposal by an incinerating burner in an incinerator (not shown in the figures), carbon dioxide ($CO_2$ gas) is generated due to burning by heating, and the carbon dioxide is absorbed by the carbon dioxide absorbent.

In particular, since the carbon dioxide absorbent is microparticulated to the nanometer level (for example, about 10 to 100 nm) and also uniformly dispersed, it can effectively absorb carbon dioxide.

An even greater reduction of $CO_2$ emissions can be achieved when combining the Nano vesicle carbon dioxide reduction additive with the linerless labels. Since linerless labels are labels without liners, less material needs to be disposed of or incinerated, meaning that both $CO_2$ emissions and disposal costs can be reduced. By using linerless labels containing a carbon dioxide absorbing additive such as the Nano vesicle carbon dioxide reduction additive in their print media or adhesive, it is possible to reduce $CO_2$ emissions.

Of course labels produced in accordance with the Nano vesicle carbon dioxide reduction additive technology are more costly than conventional labels not having the $CO_2$ reduction property. Therefore, not only for ecological reasons but also for cost efficiency, the present invention which enables a reduction in the size of a print medium for printing particular contents advantageously influences the additional costs involved in employing the Nano vesicle carbon dioxide reduction additive.

Thereby, the present invention additionally stimulates the behavior of an entity printing a large amount of labels, for protecting the environment.

In summary, the present invention provides a computer-implemented method and system for modifying given layout data on the basis of predetermined parameters for reducing unused white areas in accordance with a given printing layout. The invention is particularly applicable in the framework of label and tag printers employing continuous media. On the one hand, the reduction of unused white areas can lead to an overall reduction in the paper size, thus rendering the labels more environmentally friendly. On the other hand, the layout can also be improved, leading to a better usage of the available space for printing data thereon.

The invention claimed is:

1. A computer-implemented method for adapting the layout of content to be printed on a print medium, the method comprising the steps of receiving layout data defining the layout of the content to be printed, the layout data including size and alignment data for one or plural fields in which text and/or graphics are to be printed;

receiving text and/or graphics data to be printed for each of the fields;

determining any blank areas within the fields and/or between fields that remain unused for printing in accordance with the received layout and text/graphics data, and that exceed a predetermined maximum size of blank areas, and modifying the layout data so as to reduce said blank areas in accordance with the predetermined maximum size, wherein a layout parameter is configured to keep a distance between a particular pair of fields among the fields of a layout constant although there is a blank space between them in said step of modifying the layout data.

2. The method according to claim 1, wherein said modification of the layout data results in a reduction of the paper size required for printing the received text and/or graphics data.

3. The method according to claim 2, wherein said reduction of the paper size is achieved by a reduction of the size of at least one of said fields.

4. The method according to claim 2, wherein said reduction of the paper size is achieved by a reduction of blank areas between fields.

5. The method according to claim 1, wherein said modification of the layout data results in an enlargement of at least one of said fields to be printed in.

6. The method according to claim 1, wherein the size of a field is not reduced even if said determining step determines a blank area exceeding the predetermined maximum size in said field.

7. The method according to claim 5, wherein the content to be printed in said field is reformatted.

8. The method according to claim 7, wherein at least one of the font size of text to be printed in said field or the size of a graphic to be printed in said field in accordance with the received text and/or graphics data is enlarged.

9. The method according to claim 1, wherein said step of modifying the layout data does not modify the relative orientation of the plural fields with respect to each other.

10. The method according to claim 1, wherein said step of modifying the layout data does not modify the aspect ratio of said fields.

11. The method according to claim 1, further comprising the step of setting at least one parameter included in said layout data via a computer generated user interface.

12. The method according to claim 11, wherein said user interface is a text-based graphical user interface including one or more prompts for setting one or more parameters.

13. The method according to claim 11, wherein said user interface is further adapted to set parameters defining properties of the text and/or graphics data to be printed.

14. The method according to claim 11, wherein the user interface is further adapted to set, for at least one of the parameters set through the user interface, a parameter defining whether said particular parameter can be overwritten in said modifying step or not.

15. The method according to claim 11, wherein said predetermined maximum size of blank areas is set with said user interface.

16. A computer-based system for adapting the layout of content to be printed on a print medium, comprising an input means for receiving layout data defining the layout of the content to be printed and for receiving text and/or graphics data to be printed for each of the fields, the layout data including size and alignment data for one or plural fields in which text and/or graphics are to be printed; and a processing means for analyzing the received data and determining any blank areas within the fields and/or between fields that remain unused for printing in accordance with the received layout and text/graphics data, and that exceed a predetermined maximum size of blank areas, and for modifying the layout data so as to reduce said blank areas in accordance with the predetermined maximum size, wherein a layout parameter is configured to keep a distance between a particular pair of fields among the fields of a layout constant although there is a blank space between them in said step of modifying the layout data.

17. The system according to claim 16, further comprising a database storing said layout data.

18. The system according to claim 17, wherein the modified layout data are stored back in the database.

19. The system according to claim 16, further comprising an interface for interfacing said system with a printing device to provide the printing device with the text and/or graphics data and the modified layout data.

* * * * *